Feb. 3, 1970

J. H. DOYLE 3,493,960

SYNCHRO-TO-DIGITAL CONVERTER

Filed March 14, 1966

INVENTOR.
JAMES H. DOYLE
BY Noel G. Conway
ATTORNEY

Feb. 3, 1970    J. H. DOYLE    3,493,960
SYNCHRO-TO-DIGITAL CONVERTER
Filed March 14, 1966    9 Sheets-Sheet 2

INVENTOR.
JAMES H. DOYLE
BY Noel T. Conway
ATTORNEY

Feb. 3, 1970     J. H. DOYLE     3,493,960
SYNCHRO-TO-DIGITAL CONVERTER
Filed March 14, 1966     9 Sheets-Sheet 5

INVENTOR.
JAMES H. DOYLE
BY Noel J. Conway
ATTORNEY

Feb. 3, 1970 J. H. DOYLE 3,493,960
SYNCHRO-TO-DIGITAL CONVERTER
Filed March 14, 1966 9 Sheets-Sheet 7
SYNCHRO OUTPUT AND SECTOR RESISTOR NETWORK OUTPUT TO COMPARATORS
FIG. 8a
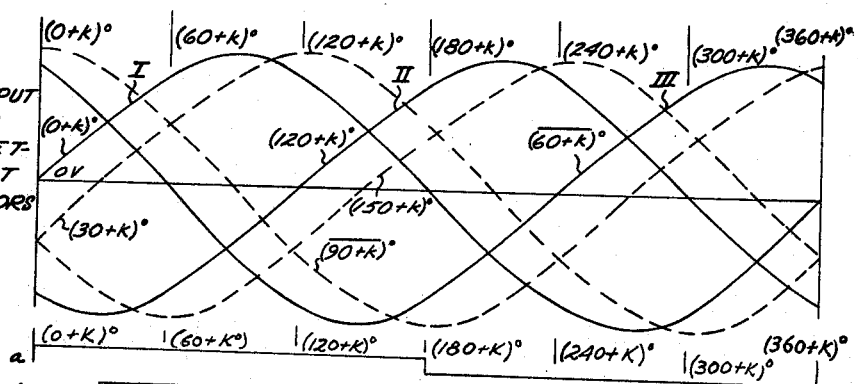
FIG. 8b
FIG. 8c
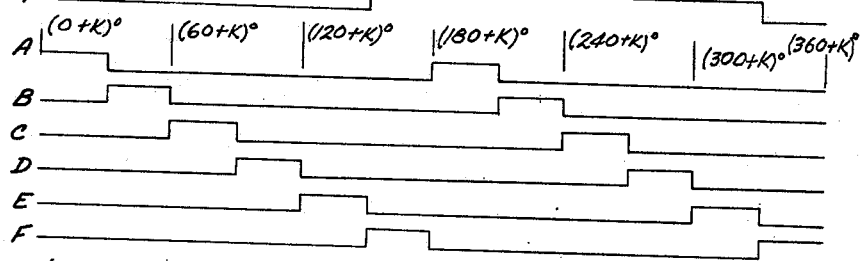
SELECTIVELY REINVERTED OUTPUT OF SECTOR RESOLUTION ANALOG SIGNAL AND REFERENCE VOLTAGE RESISTOR NETWORKS
FIG. 8d
ANALOG INPUT TO ADC AFTER (15+k)° OV-PLUS BIAS
REF. VOLTAGE TO ADC −50V
FIG. 8e
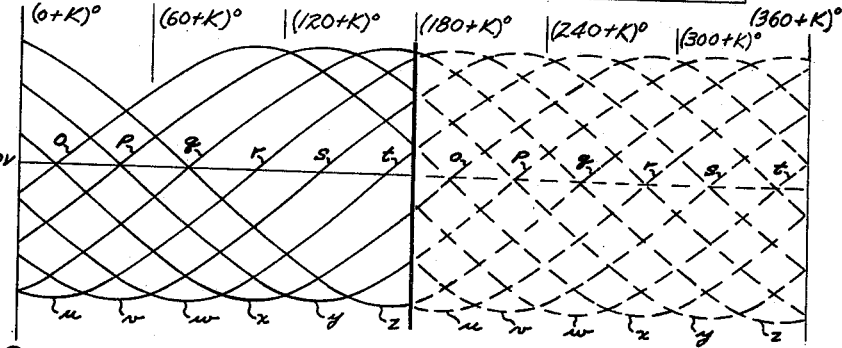
INVENTOR.
JAMES H. DOYLE
BY
Noel J. Conway
ATTORNEY INVENTOR.
JAMES H. DOYLE
BY Noel H. Conway
ATTORNEY

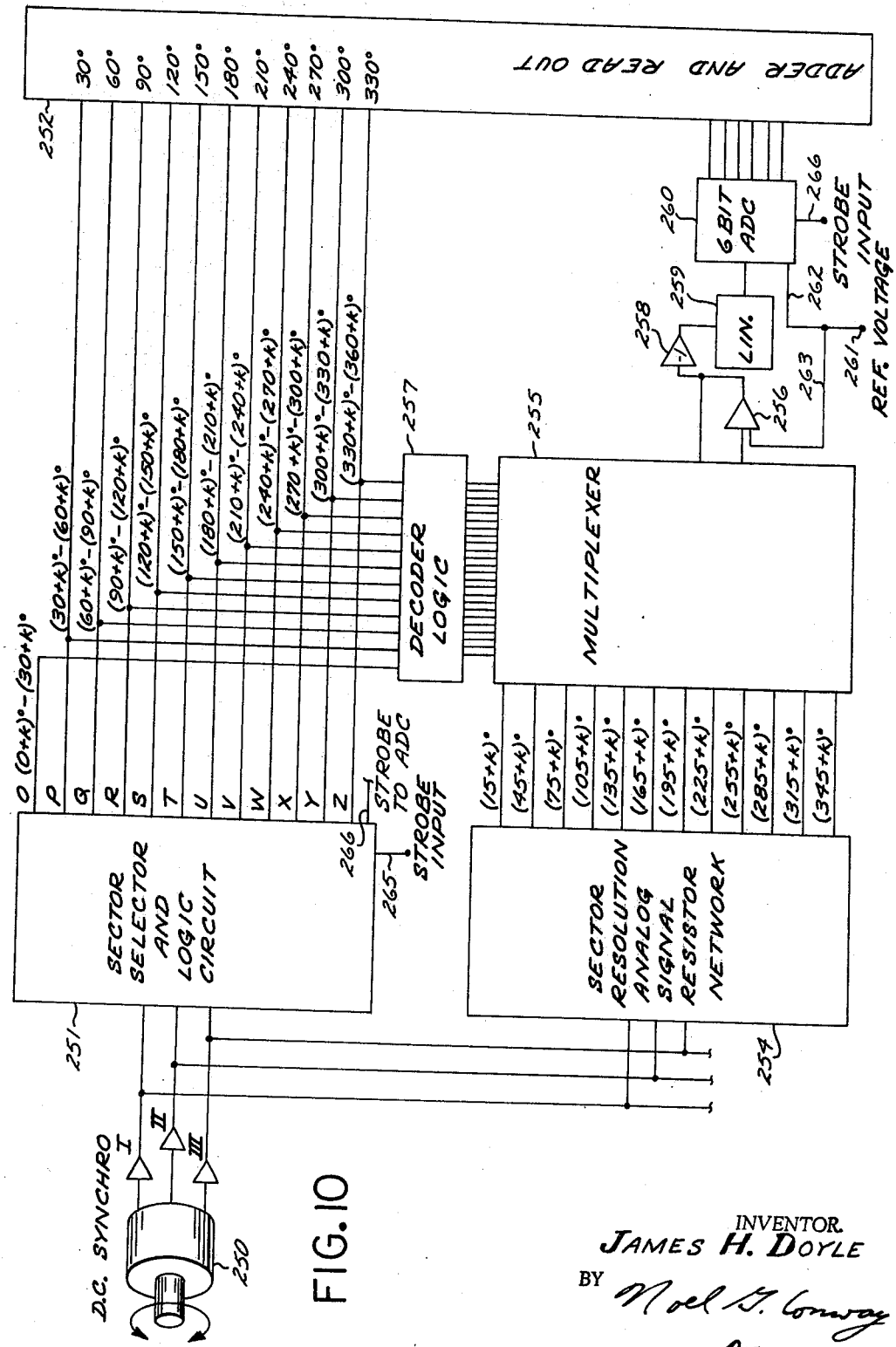

United States Patent Office 3,493,960
Patented Feb. 3, 1970

3,493,960
SYNCHRO-TO-DIGITAL CONVERTER
James H. Doyle, 2003 Ivy Hill Lane,
Orange, Calif. 92667
Filed Mar. 14, 1966, Ser. No. 533,963
Int. Cl. H04l 3/00; G08c 9/00
U.S. Cl. 340—347                              30 Claims

ABSTRACT OF THE DISCLOSURE

A synchro-to-digital converter including an analog to digital converter to offset any undesired variation in the synchro output. The analog to digital converter is responsive to the sector resolution analog signal input only upon receipt of a strobe signal.

---

This invention relates to means for converting a synchro multiline output to a multibit digital output, and more particularly to such means which uses resistor networks in order to generate signals indicative of different sectors of a 360° shaft rotation and signals indicative of a shaft angle position within a particular sector, and further incorporates means for converting said signals into a multibit digital output.

A principal area of use of apparatus incorporating the present invention is in converting the multiline output of a rotary synchro to a multibit digital output. As it is well known, a rotary synchro includes a rotor rotatably mounted within a stator, which synchros may be of either the AC or DC type. In either type, there are a plurality of output lines (usually three, and next most often four) which generate electrical signals indicative of the rotary position of the shaft and rotor of the synchro. Since the amplitude of the signals on the output lines vary as the shaft angle is increased from 0° to 360° they may be considered as analog signals.

In the DC synchro the stator has essentially a circular potentiometer with equally spaced output leads (120° apart in the case of the three line output synchro), and the rotor has a pair of wipers 180° apart with a DC voltage source such as a battery connected therebetween. Therefore, the voltage indicated on each of the output lines is a sinusoidal curve varying from 0 to a maximum over 90° of rotation and back to 0 over the next 90° of shaft rotation, then to a maximum negative potential over the next 90° of shaft rotation, and then back to 0 over the next 90° of shaft rotation. The sinusoidal curves will be out of phase with each other in the same number of degrees that the respective output lines are spaced from each other, e.g., 120° in the case of the three line output synchro.

In the case of the AC synchro there is provided in the stator a coil or pole for each of the output lines spaced equal distance apart, e.g., 120° apart in the case of the three line output synchro. In the case of the most common three line output synchro, these coils may be either Y wound or delta wound. The rotor of the AC synchro is also wound with two opposite poles, and to the rotor is supplied a single phase AC voltage. The AC voltage will induce a voltage in each stator coil according to the angular relationship between the particular coil and the poles of the rotor—which voltage generates an output signal on the output lines. The output signal of each output lines will appear as a sinusoidal curve with each sinusoidal curve appearing to be out of phase (on a drawing with voltage as the ordinate and shaft angle as the abscissa) a number of degrees equal to the number of degrees between the stator poles. The outputs of the synchro will appear to be sinusoidal whether the signal is considered as the voltage between two output lines or between one output line and common.

In the past, synchro-to-digital converters have been provided, however, they have involved expensive circuitry inolving transformers and other complex circuitry. With the present invention, relatively simple resistor networks are provided to first divide the 360° of shaft rotation into a suitable number of sectors, and also to generate analog signals which are used to indicate the shaft angle within a particular sector. Such resistor networks are not only more cheaply manufactured but lend themselves to more reliable operation.

The output of a synchro as quite often varies with time to its excitation voltage even though the shaft angle is held steady. To offset this, another aspect of the present invention is the provision of a means in the system which converts the synchro output to the reference voltage used in the analog-to-digital converter of the system. Therefore, the undesired changes in the synchro output in relation to its excitation voltage do not cause an error in the output of the analog-to-digital converter since both the analog signal converted and the reference voltage come from the same source.

Another feature of the present invention is the provision of means by which the digital outputs of the system normally remains in a steady state, and then, upon receipt of a strobe signal, the system is freed to shift the digital output to correspond to the shaft angle measured at that particular moment. Such feature is particularly useful when it is desired that apparatus incorporating the present invention to rapidly scan a plurality of synchors and record the synchro outputs on, for example, magnetic tape.

Another feature of apparatus incorporating the present invention is that there is provision for correcting small errors that occur in the system in order to make the system more accurate.

Another feature of apparatus incorporating the present invention is the incorporation of an adder which adds the various signals of the system—which adder lends itself to low cost of manufacture and increased accuracy.

Another feature of the present invention is that the same system is suitable, with or without minor modifications, for use either with a DC synchro or an AC synchro.

With the foregoing in mind, it is a major object of this invention to provide an improved synchro-to-digital converter.

It is a further object of this invention to provide a new low cost means for converting a shaft angle position to a multibit digital output.

It is another object of this invention to provide a means for converting shaft angle position to a multibit digital output wherein the means includes resistor networks to convert the synchro output into signals which can be converted into multibit digital outputs for addition into an output of the system.

A still further object of this invention is to provide a synchro-to-digital converter including means for correcting small errors which occur in the apparatus.

Still another object of this invention is to provide a synchro-to-digital converter, the output of which is normally held in a steady state, and including means for allowing the system to shift to a new output state upon receipt of the selective signal from a remote source.

It is another object of this invention to provide a synchro-to-digital converter including a fine synchro which has its shaft geared to the shaft of the coarse synchro so that the fine synchro will be turned through a substantially greater angle than the coarse synchro as the shaft of the latter is turned, and including circuitry for producing a multibit digital signal indicative of the shaft angles of the coarse synchro within a predetermined range, and further circuitry to produce a signal responsive to the shaft angle of the fine synchro indicative of the position of the coarse synchro shaft angle within that predetermined range.

It is still another object of this invention to provide a synchro-to-digital converter which is suitable for use with AC synchros and DC synchros.

It is a still further object of this invention to provide an improved adder particularly suitable for adding digital signals in a synchro-to-digital converter.

Still another object of this invention is to provide a synchro-to-digital converter including an analog-to-digital converter with a resistor network in the apparatus for generating a reference voltage for the analog-to-digital converter to offset any undesired variations in the synchro output.

Other and further objects of this invention will become apparent in the detailed description below in connection with the accompanying drawings wherein:

FIG. 8a illustrates the synchro output and sector resistor network output to comparators of the apparatus of FIG. 1 as compared to synchro shaft angle;

FIG. 8b is an indication of the outputs of one-half of each of the flip flops connected to the output of the comparators connected to the sector resistor network as compared to synchro shaft angle;

FIG. 8c illustrates the outputs of the principle lines of output from the logic circuit of the sector selector and logic circuit of FIG. 1 as compared to synchro shaft angle;

FIG. 8d illustrates the selectively reinverted outputs of the sector resolution analog signal and reference voltage resistor networks as compared as to synchro shaft angle;

FIG. 8e illustrates the analog input to the analog-to-digital converter after $(15+k)°$ bias and the reference voltage to the analog-to-digital converter as compared to synchro shaft angle;

FIG. 10 is a schematic block diagram of a third preferred embodiment of the present invention.

Figure 1:
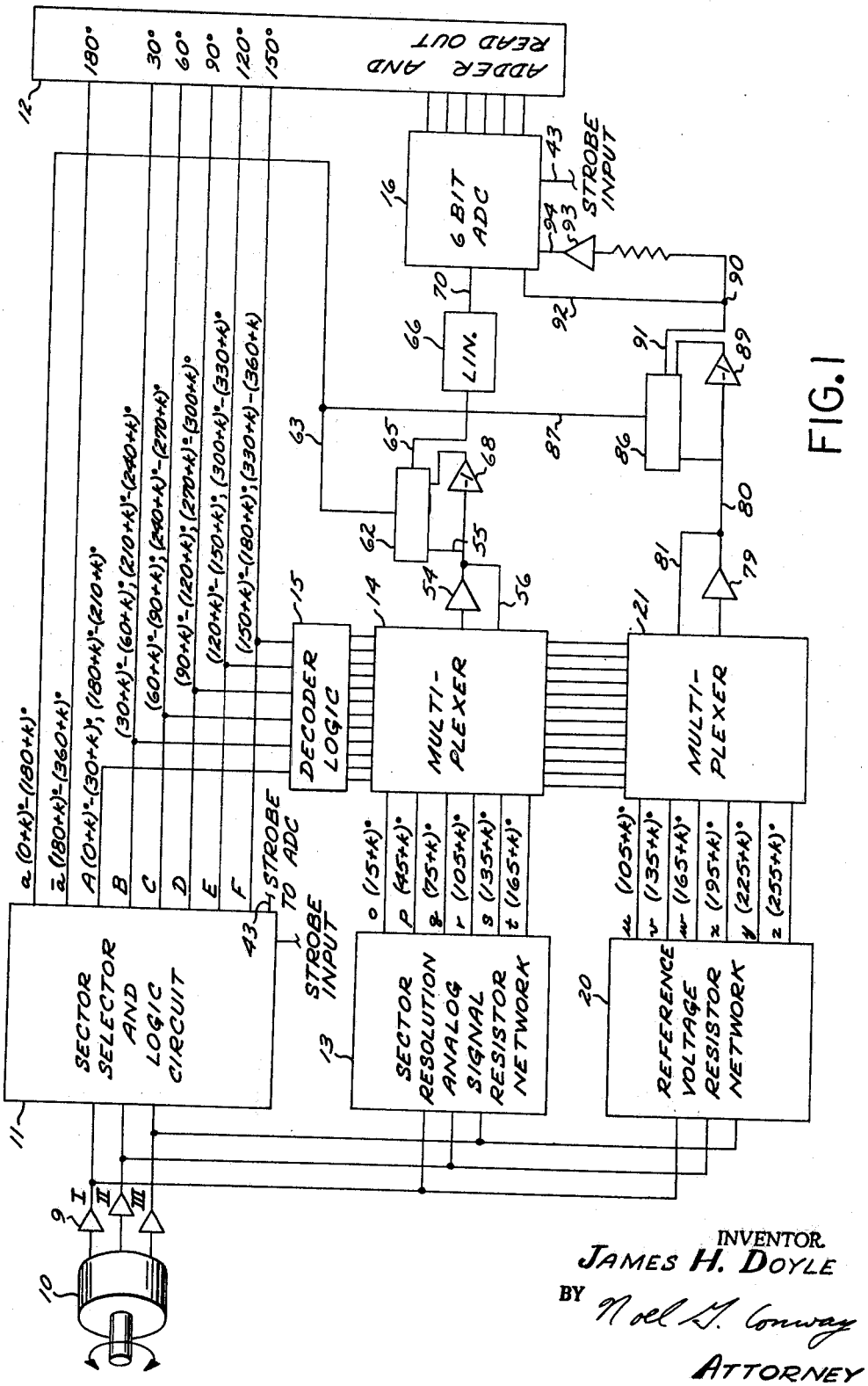
FIG. 1 is a block schematic diagram illustrating one form of the present invention.

Referring now to FIG. 1 there is shown a schematic block diagram of a first preferred embodiment of the present invention. A synchro 10 is provided with a shaft extending out of its left end which may be rotated in either direction to shaft angle positions of from 0° through 360°. The particular synchro depicted is the most common type connected through amplifiers 9 to three output lines I, II, and III at which appear voltages which vary as a function of the shaft angle in relation to each other and to common.

The output of the synchro 10 is fed to a block 11 identified as sector selector and logic circuit. As will be explained in further detail below, the circuitry within the block 11 functions to divide a 360° circle into twelve sectors of 30° each. And, the output therefrom is fed to an adder and readout circuitry, designated by block 12, which circuitry has a capability of adding the outputs of the block 11 with other digital signals hereafter described and displaying the summation thereof.

The output of the synchro 10 is also fed to a sector resolution analog signal resistor network, designated generally by block 13. As will be described in further detail below, the resistor network within the block 13 has the capability of dividing the input from the synchro 10 into six analog signals which are successively out of phase by a number of degrees equal to the number of degrees in the sector—in this case 30°—through lines $o$ to $t$. The lines $o$ to $t$ are fed to a multiplexer 14 which is controlled by the inputs from lines A to F operating through a decoder logic circuit, indicated by block 15, in order to feed to an analog-to-digital converter 16 the sector resolution analog signal corresponding to the sector in which is located the particular shaft angle of the synchro 10. The further details of the operation of the sector resolution analog signal resistor network 13, the multiplexer 14, and decoder logic 15, as well as the components between the output of the multiplexer and the input of the analog-to-digital converter 16 will be described in further detail below. At this time, it will only be stated that the analog input to the analog-to-digital converter 16 is a curve which increases as the shaft angle within a particular sector increases. In order to improve the resolution of the sector, the resistor network 13 is weighted in order that the phase of the analog signal on each of the lines $o$ to $t$ is 15° forward (i.e., there is a 0 volt output at 15° greater shaft angle) than the beginning of the respective sector to which the particular analog signal line $o$ to $t$ corresponds.

The analog-to-digital converter 16 requires reference voltage with which the analog input to the analog-to-digital converter is compared in order to accomplish the conversion. Since the amplitude of the output of the AC synchro (as well as a DC synchro to a lesser extent) varies even though the shaft angle and excitation remains constant, it is desired that the reference voltage to the analog-to-digital converter be produced from the synchro output to facilitate accuracy in the analog-to-digital converter. To this end, there is provided a reference voltage resistor network indicated by block 20 which provides six output signals on lines $u$ to $z$ respectively. As will be described in further detail below, the reference voltages are to be as near level as possible throughout the swing of 30° through the sector. Accordingly, the phase of the signals on the output lines $u$ to $z$ are each 90° out of phase from their respective corresponding sector resolution analog signals on the lines $o$ to $t$. In FIG. 8d, the phase relation of the outputs of the sector resolution analog signal resistor network 13 and the reference voltage resistor network 20 is illustrated. The relation between the curves shown in FIG. 8d in full line and the curves shown by dashed lines will be explained below.

The outputs of the reference voltage resistor network 20 are fed to a multiplexer 21 which is controlled the same as the multiplexer 14. From the multiplexer 21 the selected reference voltage signal is fed to the analog-to-digital converter 16 through components to be described in further detail below. As also will be described in further detail below, the reference voltage signal is used to offset the analog input to the analog-to-digital converter so that it will be always of one polarity as the shaft angle moves from one end of a sector to the other end of the sector.

A preferred form of the analog-to-digital converter 16 will be described below. At this time, suffice it to say that the digital output of the analog-to-digital converter 16 is fed to the adder and readout block 12 to be added with the output of the sector selector and logic circiut 11, and then the sum thereof is presented as a system output.

It will be noted that the outputs of the sector selector and logic circuit 11 bear the designation of the number of degrees wherein a signal appears on the various output lines. For example, line $a$ is designated $(0+k)°-(180+k)°$. This indicates that a "true" signal is generated on line $a$ throughout the 180° from $(0+k)°$ to $(180+k)°$. As will be described in further detail below, the analog-to-digital converter 16 has an output capacity in excess of 30°, which excessive capacity is used in the system in order to compensate for any errors which might occur should the circuit 11 shift to a new sector output before the shaft angle reaches the design beginning that particular sector. Therefore, the analog-to-digital converter 16 is set to have an output indicative of $(0+k)°$ when the sector selector and logic circuit 11 is supposed to shift to a new sector, and the outputs of the sector selector and logic circuit 11 are weighted in the adder and readout block 12 as a number of degrees which is $k°$ less than that at which the sector actually begins.

For example, $k$ preferably equals 4 or 5° since the sector selector and logic circuit 11 will never shift more than 4 or 5° before it is supposed to. Assuming that it is determined that $k$ will equal 5°, there is a signal generated on line B from 35° to 65° and from 215° to 245° (assuming that the sector selector and logic 11 switches at the designed points). When the 35° is reached and a signal is put out on line B, simultaneously the analog-to-digital converter 16 has an output of 5°. Therefore, by weighting the output of line B as 30° the output of the system is a correct 35°.

However, assuming that the sector selector and logic circuit 11 erroneously switched to put out a signal on line B at 32° there would still be a correct system output since, at that time, the analog-to-digital converter 16 would have an output of 2° which would be added in the block 12 to the 30° weight given the output signal of line B.

Now, assume that the sector selector and logic circuit 11 erroneously fails to switch at the designated point. At, for example, 38° there would still be a correct system output since, at that time, the analog-to-digital converter 16 would have an output of 38° which would be added in the block 12 to the 0° weight given at the output of the sector selector.

In the drawings the letter $k$ has been used on the various lines rather than a certain number of degrees in order to further demonstrate that the offset between the analog-to-digital converter 16 and the sector selector and logic circuit 11 need not be a particular number of degrees.

As can be seen, the use of the $k°$ offset permits the system to be correct no matter whether the sector selector and logic circuit 11 shifts too early or too late. If the offset is not used, the system would have to correct in both the positive and the negative direction. And, this would require circuitry of considerably greater complexity and expense.

Figure 2:
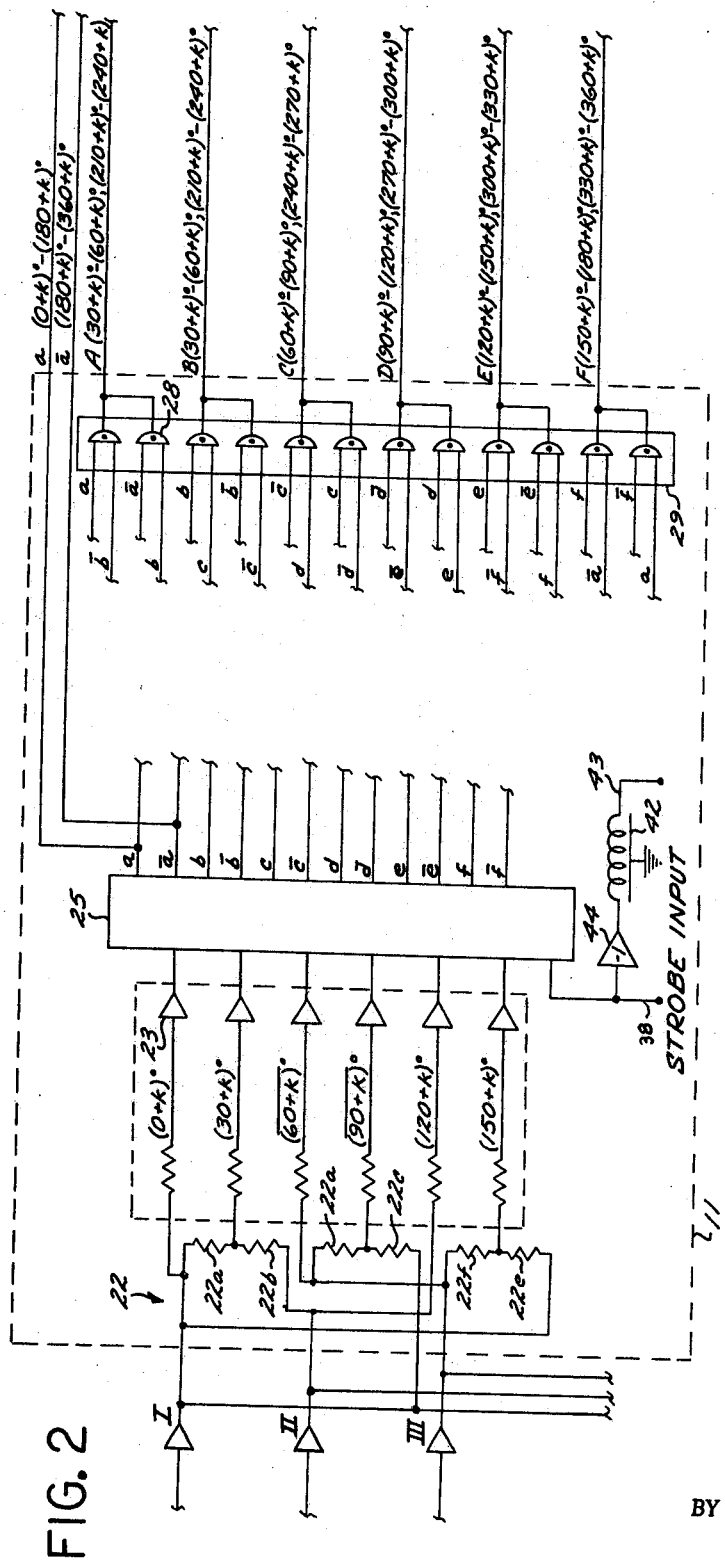
FIG. 2 is a more detailed block schematic diagram of the sector selector and logic circuit of the system shown in FIG. 1.

Referring now to FIG. 2 and FIG. 8a the circuitry within the bloc 11 will be described in further detail. Within the block 11 the inputs I, II and III of the synchro 10 are fed to a sector selector resistor network, indicated generally by the arrow 22 with six signal carrying lines going to comparators 23. As can be seen, the top line which is connected directly to synchro output line I is designated as $(0+k)°$. What is meant by the designation can be better seen in FIG. 8a. There it can be seen that a line which is designated as $(0+k)°$ is a sinusoidal curve which passes through 0 in a positive direction at a shaft angle of $(0+k)°$. Actually, a shaft angle of $(0+k)°$ is determined by positioning the synchro 10 until there is a 0 voltage output on line I at the output side of amplifier 9—which output would become more positive as the shaft angle is increased. If it is decided that a safety factor of 5° is desired for $k$, then 0 shaft angle is arbitrarily set as 5° back from the position at which there is the aforementioned voltage output on output line I.

In a three line output synchro the outputs of the various lines appear to be as three sinusoidal waves 120° out of phase as compared to shaft angle. In FIG. 8a, this is illustrated.

In order to position the output of the second line of the resistor network at $(30+k)°$, the line is connected by resistors 22a and 22b respectively to the output lines I, and II. Since output line II is at 120°, the resistor 22b is in the order of two times as large as resistor 22a. In FIG. 8a the line $(30+k)°$ is illustrated. As can be seen, there will be a plus input to the comparator 23 of this line when the shaft angle is between $(30+k)°$ and $(210+k)°$.

The manner in which the relative values of the resistors 22a and 22b is determined will now be described. As best seen in FIG. 8a, at $(30+k)°$ shaft angle the voltage signal of line I is equal to the maximum amplitude of the signal times the sin of 30°, while the voltage of line II is equal to the maximum amplitude of signal on line II (which maximum amplitude is the same as line I) times the absolute value of sin of $(120°-30°)$, i.e., 90°. Since the amplitude of the signals on lines I and II are the same and since the sin 30°=0.5 and absolute value of the sin of 90° is 1, the ratio of the resistors 22a to 22b is 1:2. More generally the ratio of the resistor value is determined by using the ratio of the sin of the angle between the phase of the synchro output line to which one resistor is connected and the desired phase of the line, in this case $(30+k)°$, and the sin of the angle between the phase of the other synchro output line to which the other resistor is connected and the desired phase of the line.

It will be noted that the output of line III crosses the 0 voltage line at $(60+k)°$, however, the signal increases in the negative direction as the shaft angle is increased contrasted to the previously described to lines to the comparators 23. The output of the line III can be used directly because the outputs of the comparators 23 are fed to a register cards 25 having six flip-flops, each of which have two outputs indicating a true or false condition. Therefore, by reversing the output leads of the line indicated as $(\overline{60+k})°$, or by (as is done in this case) changing the logic of block 29, the ultimate output of the block 11 can be made the same as if the line actually had a phase of $(60+k)°$.

The next line in the sequence is designated as $(\overline{90+k})°$ because it passes the 0 voltage level in a negative direction at the designated shaft angle by being connected between output lines I and III by resistors 22c and 22d respectively. The ratio of the values of the resistors 22c and 22d are determined as the ratio of the resistors 22a and 22b. The output of the comparator 23 connected to this line, which output is negative from $(90+k)°$ to $(270+k)°$ and positive at other shaft angles is treated in the same manner as the signal of the line designated as $(\overline{60+k})°$.

The fifth line, designated $(120+k)°$ is connected directly to output line II while the sixth line, designated $(150+k)°$ has its phase positioned by being connected between output lines I and III by resistors 22e and 22f respectively.

As explained above, the phase of the various signals can be shifted by the appropriate selection of the resistors 22a to 22f. However, it is also desired that the amplitude of the signal on each line be current limited, and accordingly, there is a limiting resistor in front of each comparator 23.

Figure 7:
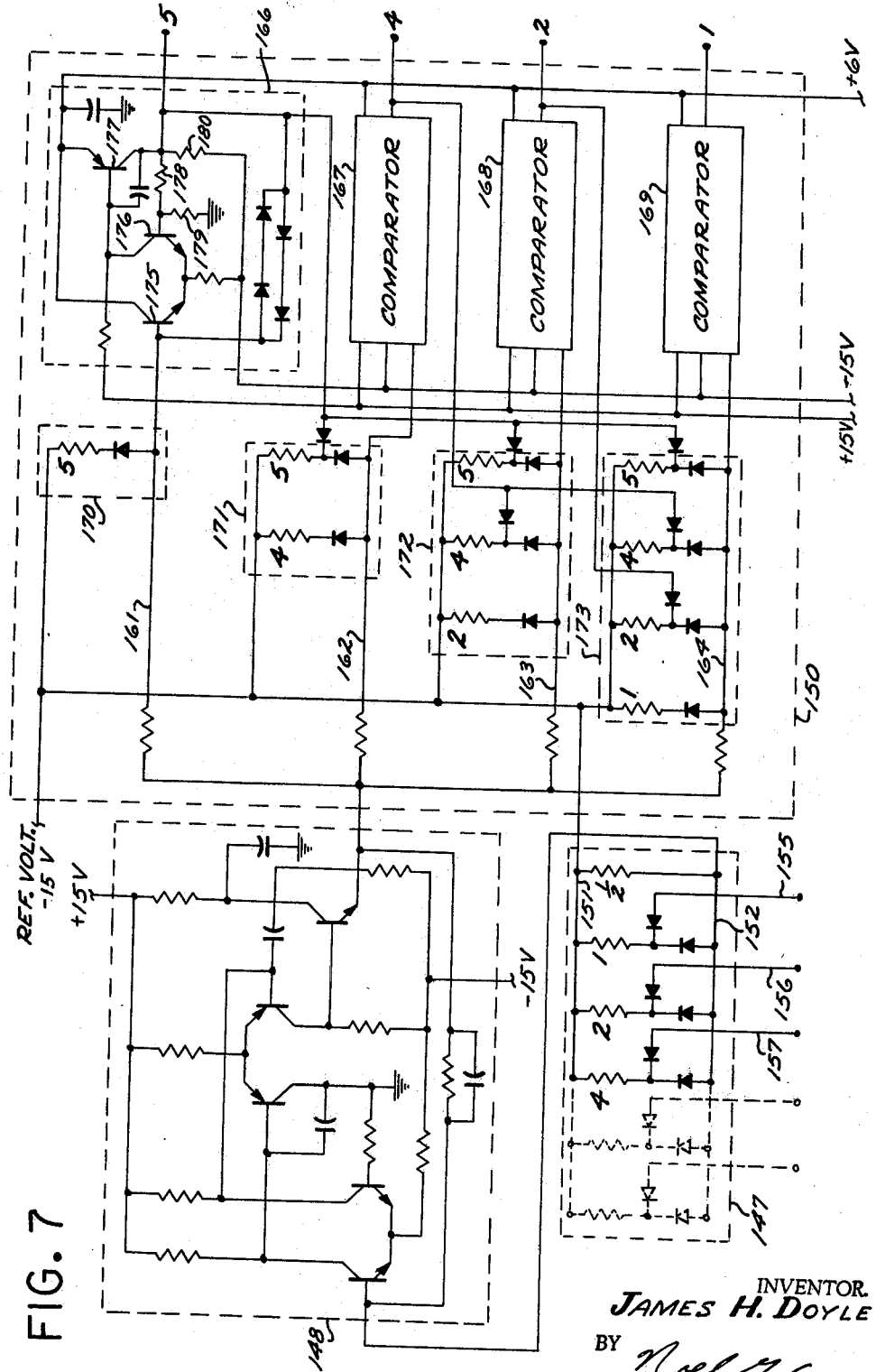
FIG. 7 is a schematic diagram of one of the adder units preferably used in the adder disclosed in FIG. 6.

The comparators 23 may be of the type disclosed in FIG. 7 of this application, and will present a +3 volt output when the input to the comparator is negative, and a −3 volt output when the input to the comparator is positive. This plus or minus output is fed to the register card as aforesaid. The output of the register card 25 is depicted in FIG. 8b, where it can be seen that the line designated $(0+k)°$ has generated a plus signal on the line from $(0+k)°$ to $(180+k)°$. Naturally, the $\bar{a}$ line has a plus signal from a shaft angle of $(180+k)°$ to $(360+k)°$. In FIG. 8b the relation of the output signals of the lines $b$, $\bar{c}$, $\bar{d}$, $e$, and $f$ are also illustrated with it being understood that the outputs of lines $\bar{b}, c, d, \bar{e},$ and $\bar{f}$ being the opposite of their counterpart.

The outputs of the register card 25 are fed to twelve "and" gates 28 in logic block 29. With this logic, it can be seen that a $b$ signal and a $c$ signal applied to "and" gate 28 having its output connected to line B will cause a true signal on line B when the shaft angle is between $(30+k)°$ to $(60+k)°$. Also, a $\bar{b}$ signal and a $\bar{c}$ signal supplied to the "and" gate connected to the line B will cause a true signal on said line when the shaft angle is between $(210+k)°$ and $(240+k)°$. The signals generated on the lines A to F as compared to shaft angle are depicted in FIG. 8c. The signals to the various other "and" gates of the logic block 29 are illustrated in FIG. 2 and cause on the lines A to F signals as compared to shaft angle as depicted in FIG. 8c, and will not be described in further detail.

Figure 3:
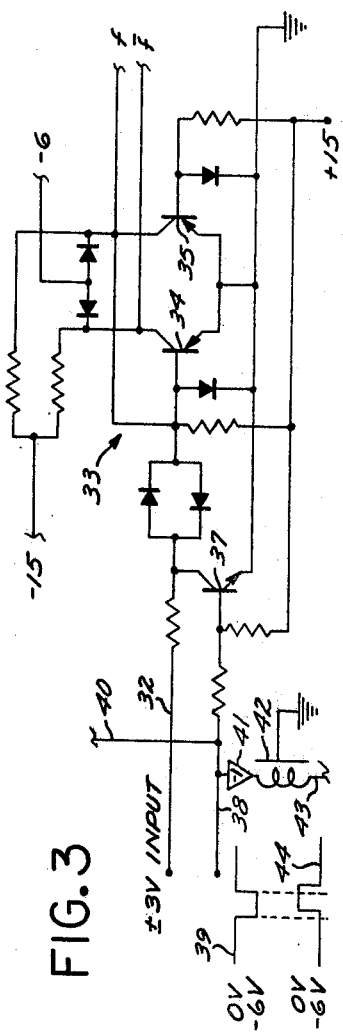
FIG. 3 is an electrical schematic of an exemplary flip flop which may be included in the circuitry illustrated in FIG. 2.

Referring now to FIG. 3 one of the flip-flops in the register card 25 will be described in further detail, the other flip-flops being the same. In FIG. 3 there is shown a line 32 which receives a plus or minus 3 volt input from the comparator 23 of the line designated $(150+k)°$—which input is fed to a flip-flop, designated generally by the arrow 33. The flip-flop includes transistors 34 and 35 as well as a switching transistor 37 having its base connected to strobe input 38.

In FIG. 3, line 39 depicts an illustrative portion of the signal on the strobe input 38. Normally there is a 0 volt signal at said input 38. Such 0 signal allows the transistor 37 to be on—thereby shorting the input signal on input line 32 to be shunted to ground allowing the flip-flop 33 to remain in its current state.

By circuitry not shown the strobe signal is put in for freeing the system when the output curves of the lines I to III is as shown in FIG. 8a. Upon receipt of a strobe signal—which is, for example, −6 volts—the transistor 37 is turned off and the signal from the respective comparator 23 is fed to the flip-flop 33. As can be seen, the comparators 23 are constantly following the synchro 10 output. However, the flip-flop 33 can only follow the output of the synchro 10 during the time that there is the −6 volt signal on strobe input 38. During this last mentioned condition, if a −3 volts is applied at line 32, the transistor 34 is turned on and the transistor 35 is turned off—giving an output signal only on line $f$. Conversely, if a +3 volts is supplied to line 32, the transistor 34 is turned off and the transistor 35 is turned on—giving a plus signal only on the line $f$. The strobe signal is fed to the other flip-flops of the register card 25 through a line 40.

As will be described in further detail below, the analog-to-digital converter 16 will be held in an output state when a −6 volt signal is fed to a "holding circuit" of the comparators of the converter. Since, in this particular embodiment, it is desired that the output of the analog-to-digital converter 16 be "held" except upon receipt of the strobe signal, a digital inverter amplifier 41 is connected to strobe input 38 to invert the signal and feed it through a delay line 42 to line 43 which carries it to the analog-to-digital converter 16.

Line 44 in FIG. 3 depicts the relation between the strobe signal input and the signal to the holding circuit of analog-to-digital converter 16. The strobe signal is, for example, appropriately 10 microseconds long, and the delay line 42 functions to delay the signal approximately one or two microseconds in order to give the sector selector and logic circuit 11 time to settle. The particular analog-to-digital converter 16 illustrated will settle within such a short time before it is again placed back in the held condition.

Figure 4:
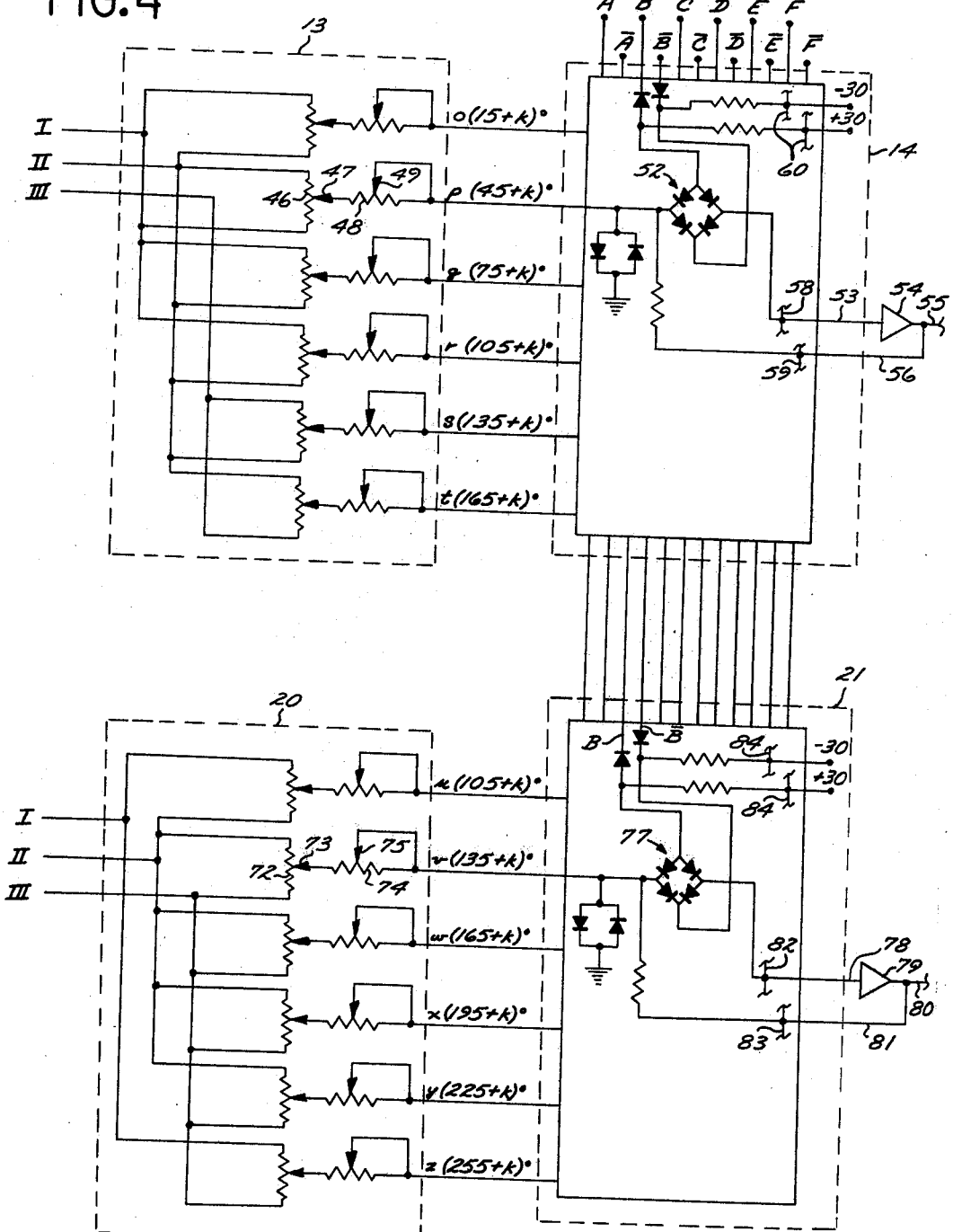
FIG. 4 is a partial schematic diagram of the sector resolution analog signal resistor network and the reference voltage resistor network, and their associated multiplexers which are depicted in FIG. 1.

Referring now to FIG. 4, the sector resolution analog signal resistor network 13 will be described in further detail. For purposes of accuracy of the system it is preferred that the phase of each of the lines $o$ to $t$ be "set" so that the signal therefrom is 0 volts going in the positive direction when the shaft angle is at the middle of the particular sector to which the particular line $o$ to $t$ corresponds. For example, the line $o$ is set by the resistor network to pass through 0 voltage signal when the shaft angle is at $(15+k)°$, and therefore, when the shaft angle is in the first half of the sector there will be a negative signal on line $o$, and during the other half of the sector there will be a positive signal in line $o$.

One aspect of the present invention is the manner in which the signals on the lines $o$ to $t$ are correctly and easily provided. With reference to line $p$ it can be seen that a resistor, or potentiometer, 46 is connected between the output lines 1 and 2. By means of a wiper 47, the phase of the signal on line $p$ may be shifted toward the phase of line II by moving the wiper 47 upward, and may be moved toward the phase of the line I by moving the wiper downward. Contrasted to the sector selector resistor network 22 which merely provides true and false signals, the resistor network 13 must provide analog signals which are accurately placed in terms of amplitude as well as phase. To this end, there is also provided for the line $p$ a precision output resistor 48, the resistance of which may be easily and accurately adjusted by positioning wiper 49. In order to position the phase of the line $p$ to the desired $(45+k)°$ the synchro shaft is turned to this shaft angle. (Remember that the position of 0 shaft angle has been previously determined when setting the sector selector resistor network values.) At that time, the wiper 47 is moved until there is a 0 output on the line $p$. Then this process is repeated for each of the lines $o$, $q$, $r$, $s$, $t$. The values of the resistors are determined by the amplitude of the signals on the lines I to III, however, the ratio of the resistors is determined by the phase desired on the line.

After the outputs of the lines $o$ to $t$ have been placed in the proper phase, the amplitude of the signal is set. In the case of line $p$, the shaft angle is turned to a position of 58° where the output signal is near maximum for that sector. Then the wiper 49 is adjusted to the desired amplitude to cause the analog-to-digital converter 16 to have a proper output for that angle, to wit, 28. Subsequently the same process is repeated for the lines $o$ and $q$ to $t$—thereby insuring that the slope of the analog signal curve in the range that it is used is the same for each of the lines $o$ to $t$.

The circuitry in the decoder logic block 15 is a set of six double inverters with outputs that swing + or −3 volts. Therefore, the twelve output lines of the decoder logic block 15 will present signals of A to F and $\bar{A}$ to $\bar{F}$ according to the presence or absence of a signal on the lines A to F.

In the multiplexer 14 there are six bridge switches, however, since they are all the same, only the bridge switch indicated generally by the arrow 52 having its input connected to the line $p$ is illustrated in FIG. 4. The bridge switch 52 operates such that when there is a positive signal on line B and a negative signal on line $\bar{B}$, the signal of line $p$ is transmitted through output line 53 to an operational amplifier 54. Connected to output line 55 of the operational amplifier 54 is a conventional feedback line 56 which goes to the input side of the bridge switch 52. Line 58 is connected to the output lines of the other five bridge switches while line 59 is connected to the feedback line of the other five bridge switches. Similarly, lines 60 connect the power supplies to the other five bridge switches.

It can be seen that the six lines $o$ to $t$ provide a signal with a positive slop as shaft angle increases only during first 180° of shaft angle, and during the second 180° of shaft angle there would be a negative slope to the signal. For example, the signal of line $p$ increases with shaft angle from $(30+k)°$ to $(60+k)°$, however, 180° later (when there is again a plus signal on line B), the signal on line $p$ becomes more negative as the shaft angle proceeds from $(210+k)°$ to $(240+k)°$. Also, as will be described in further detail below, the analog-to-digital converter 16 is of the type that here is a 0 digital output when the analog input signal is 0 and the output of the converter increases as the analog input signal becomes more positive. However, because of the polarity restrictions of the components in the analog-to-digital converter 16, it cannot convert both a positive and a negative analog signal. Therefore, the system includes additional circuitry to cause the sector resolution analog signal fed to the analog-to-digital converter 16 to always have a positive slope, and always be positive. To meet the last mentioned requirement, the sector resolution analog signal is biased in a positive direction an amount equal to $(15+k)°$ of shaft rotation by means which will be described below. The means for insuring that the slope of the analog signal is always positive will now be described.

Connected to the output line 55 of the amplifier 54 is a transistorized single pole double throw switch 62 which operates in response to a signal through line 63 connected to the output of line $a$ of the register card 25. The switch 62 has its output 65 leading directly to linearizer 66, while one input is connected to the output of the amplifier 54 and the other input connected to the output of inverter amplifier 68. From the linearizer 66 the signal is conducted through analog-to-digital converter 16.

In the presence of a signal on the line 63 (i.e., when the shaft angle is between $(0+k)°$ and $(180+k)°$) the signal from the amplifier 54 is directed through the inverter amplifier 68 to the linearizer 66. Therefore, after the signal has been inverted by the operational amplifier 54, it is reinverted by the amplifier 68 to give it a positive slope. In FIG. 8d there is illustrated the analog signals on lines $o$ to $t$ as compared to shaft angle after the analog signals have been inverted by amplifier 54 (shown in dashed lines) and reinverted by amplifier 68 (shown in full lines). When there is no signal on line 63 the signals are not reinverted. However, the signals have a negative slope as they exit the sector resolution analog resistor network 13—which slope becomes positive by the inverting action of the operational amplifier 54. Therefore, throughout the full rotation of the synchro shaft, the signal at line 70 always has a positive slope as shaft angle increases. The fact that this signal is negative for one half of the sector will be compensated for by means to be described below.

The curves in FIG. 8d are to show the relative phase between the different curves depicted. However, the maximum amplitude of the reference voltages used are significantly greater than the maximum amplitude of the sector resolution analog signals fed to the analog-to-digital converter. The amplitude appears to be the same because if the amplitude had been made to scale, the sector resolution analog signal curves would be so flat that they would not show clearly enough the intersection of the curves with the 0 voltage level. Also, the curves are not merely shown in the portions thereof fed through the multiplexer 14 in order to show more clearly the phase relation of the curves.

At this time the means for generating the reference voltage for the analog-to-digital converter 16 will be described in further detail. Referring to FIG. 4 again, there is shown an electrical schematic of the reference voltage resistor network 20 out of which appear signals on line $u$ to $z$. As in the case of the sector resolution analog signal resistor network 13, none of the signals on the lines $u$ to $z$ are exactly in phase, or exactly out of phase with the signals on lines I to III. Therefore, the phase of each of the lines $u$ to $z$ is positioned by resistor means. For example, to position line $v$, a precision resistor 72 is connected between lines II and III with wiper 73 positionable along the resistor 72. For purposes of trimming the amplitude of the signal on the line $v$ there is provided a precision output resistor 74 with shunt wiper 75. The resistor networks for the other lines $u$ and $w$ to $z$ are comparable to the network for the line $v$.

It is desired that the reference voltage be as near level as possible throughout the particular sector in which it is used. Also, for the particular analog-to-digital converter 16, the reference voltage must be negative. Therefore, the phase of the signal on each of the reference voltage lines $u$ to $z$ is set 90° ahead of the phase of the corresponding sector resolution analog signal line $o$ to $t$ with which it is used. Referring to FIG. 8d, it can be seen that if line $u$ is set with its phase at $(105+k)°$—that is, the signal passes through 0 in the positive direction at a shaft angle of $(105+k)°$—the curve will reach its maximum negative amplitude at $(15+k)°$ shaft angle. Although the reference voltage thus provided increases negatively for the first 15° of the sector and then decreases negatively, this curve can be compensated for by the linearizer 66.

Referring now to FIG. 4, the line $v$ is set by turning the shaft angle to $(135+k)°$ and adjusting the wiper 73 until there is a 0 voltage output on the line. Then the same process is repeated for the other lines $u$ and $w$ through $z$ so that there is a 0 output on each of the lines when the shaft angle is at the position designated on the line in FIG. 4.

Since the amplitude of the signals on lines $u$ through $z$ would not normally be equal, the shaft angle is turned to $(45+k)°$ and the wiper 75 is adjusted on resistor 74 until the desired maximum reference voltage is indicated at the output of output amplifier 79 of the multiplexer 21. Then, the process is repeated for each of the other lines $u$ and $w$ through $z$ with the shaft angle in the appropriate respective positions.

The lines $u$ to $z$ lead to the multiplexer 21 which is the same as the multiplexer 14 and includes six bridge switches. Connected to the line $v$ there is illustrated a bridge switch, indicated generally by the arrow 77 which has its output line 78 connected to operational amplifier 79—which gives a maximum output of −50 volts. Output line 80 of the amplifier 79 has connected to it a feedback line 81. As in the case of the multiplexer 14, line 82 is connected to the output lines of the other five bridge switches of the multiplexer 21, and line 83 is connected to the feedback line of the other five bridge switches of the multiplexer. Lines 84 serve to connect the power supply to the other five bridge switches. As in the case of the multiplexer 14, the signal of line $v$ is fed to the amplifier 79 when there is a positive signal on the line designated B and a negative signal on line designated $\overline{B}$. Conversely, there is no signal feed from line $v$ to the amplifier 79 when there is a positive signal on the line designated B and a negative signal on the line designated B. The lines $u$ and $w$ to $z$ are similarly connected to respective bridge switches which are operated in response to the logic of the signals on the lines A to F and $\overline{A}$ to $\overline{F}$ coming out of the sector selector and logic circuit 11.

During the 180° of the first six sectors of shaft angle, the inversion caused by the amplifier 79 must be compensated for. To this end, there is provided a transistorized single pole double throw switch 86 which is connected through line 87 to the line 63. The switch 86 feeds the signal from the output of inverter amplifier 89 to junction 90 during the first six sectors—thereby reinverting the reference voltage signal to a negative polarity. During the last six sectors, the signal on the lines $u$ to $z$ would be positive when fed to the amplifier 79, and therefore, there is no need to reinvert the negative output of the amplifier. Therefore, the switch 86 feeds the signal to the junction 90 directly from line 80. As in the case of the sector resolution analog signals, in FIG. 8d, the reference voltage curves which have been reinverted are shown in full lines, and the reference voltage curves that have not been reinverted are shown in dashed lines.

From the junction 90 the reference voltage is fed through a line 92 to the analog-to-digital converter 16 to be used as a reference voltage. Also, from the junction 90 there is led a signal through an amplifier 93 to bias input line 94. This last mentioned signal—which has been again reinverted by amplifier 93—serves to bias the analog input signal on line 70 in a manner to be described below.

Figure 5:
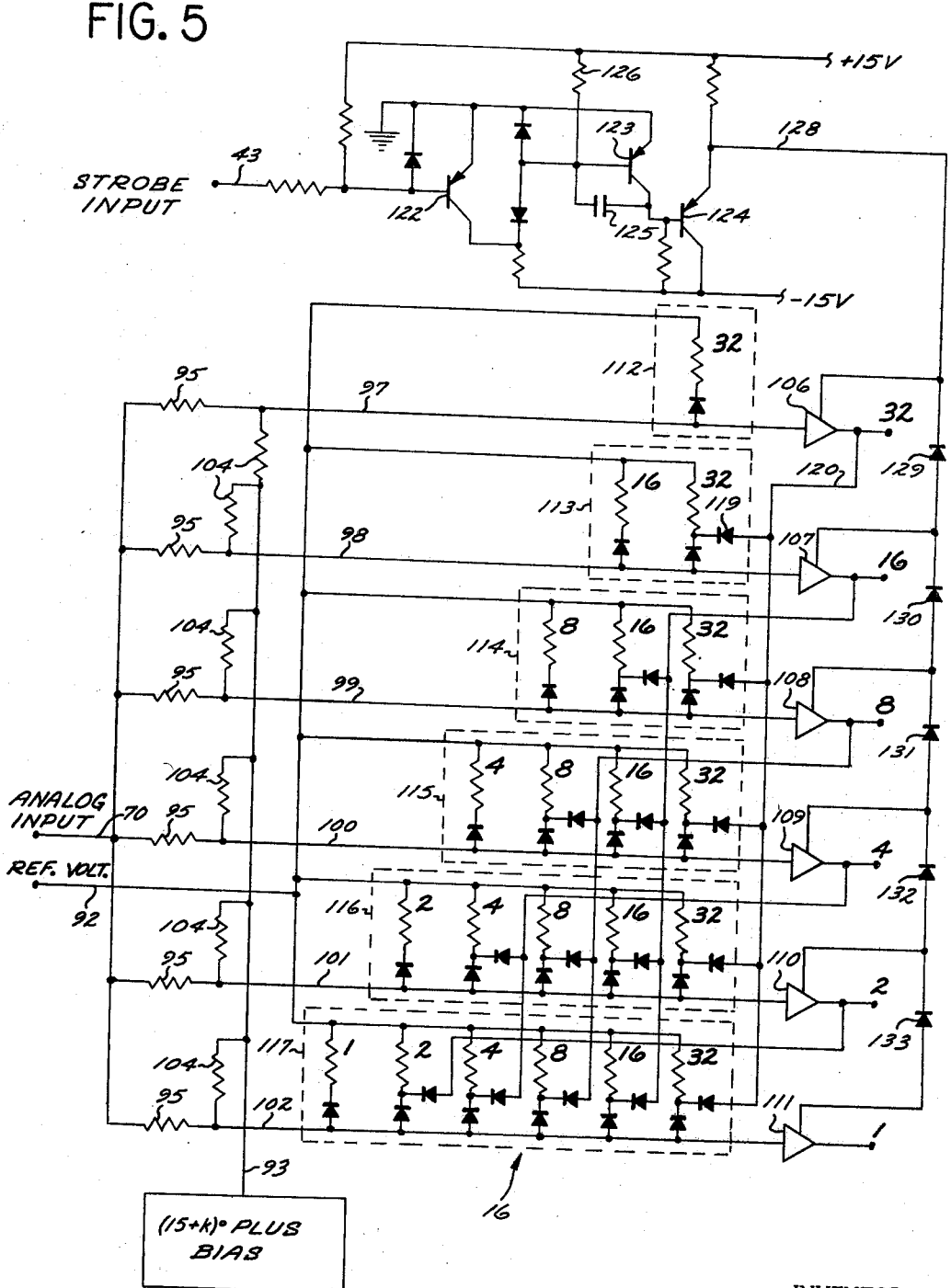
FIG. 5 is a schematic diagram of a preferred analog-to-digital converter used in the system depicted in FIG. 1.

Referring now to FIG. 5, there is shown an electrical schematic of a preferred form the analog-to-digital converter 16 may take. The analog-to-digital converter 16 operates in a manner similar to one of the analog-to-digital converters illustrated in my U.S. Patent No. 3,255,347, entitled Analog Digital Converter, issued Dec. 21, 1965, with the inclusion of means to hold the output state of the analog-to-digital converter similar to the comparators shown in my co-pending U.S. patent application Ser. No. 334,336, filed Dec. 30, 1963, now U.S. Patent No. 3,281,608 entitled Bistable Comparator Means With Means for Selectively Holding the Comparator Means in an Output State.

The analog input of line 70 is fed to the converter 16 through six input resistors 95 to analog signal busses 97 to 102 with one bus for each bit of the converter. Since, as previously mentioned, the signal on the line 70 varies between a negative polarity and a positive polarity and the converter 16 can only convert positive analog inputs the plus voltage bias on line 93 is fed to each of the analog signal busses 97 to 102 through resistors 104. The bias is sufficient to increase the analog signal at the junction of the respective resistors 104 with the respective analog signal busses 97 to 102 to 0 volts when the shaft angle is at the beginning of a particular sector $-k°$. If the system is set up so that the analog signal input to the converter 16 increases one volt per degree of shaft angle increase and $k$ equals 5°, the bias through the resistors 104 will be a $+20$ volts. In such case, if the sector selector and logic circuit 11 shifts from a lower sector to a higher sector at the proper position, the output of the analog-to-digital converter 16 would indicate 5° immediately after the shift. However, this is compensated for by the fact that the outputs of the sector selector and logic circuit 11 would be weighted in the adder and readout 12 as 5° less shaft angle than the designed sector shift position.

The analog signal on the line 70 is being handled in parallel which permits a very high speed converter. After the signal has been biased by the input from the line 93, the analog signal busses 97 to 102 lead to comparators 106 to 111 respectively through binary weighted analog signal bias means 112 to 117 respectively.

As mentioned in my U.S. patent application Ser. No. 334,336, now U.S. Patent No. 3,281,608 each of the comparators compare to a 0 input voltage, and will give a negative output voltage if the input voltage is positive and a positive output voltage if the input voltage is negative.

At this time, the operation of the binary weighted analog signal bias means 112 to 117 will be described in further detail. In the bias means 112 there is shown a resistor weighted as 32 connected between the analog signal bus 97 and the reference voltage. The resistor is designated by the number 32 because it is of such size that the reference voltage will bias the bus 97 32 units in the negative direction. If the overall system has been designed so that 1 volt corresponds to 1°, then there would be a negative bias of 32 volts caused by the connection of the reference voltage to the bus 97 through the resistor designated as being weighted 32.

It will be noted that the bias means 113 includes two resistor network arms one of which is weighted as 16 and the other of which is weighted as 32. The resistance value of the resistor in the arm weighted as 16 is twice that of the arm weighted as 32, and therefore, the conductance of the resistor weighted as 16 is one-half of the resistor weighted as 32. Further, the arm weighted as 16 is always connected between the bus 98 and reference voltage. However, the biasing effect of the arm weighted as 32 is not always effective on the analog signal bus 98. This is because a diode switch 119 is connected at the analog signal bus 98 end of the resistor weighted as 32, which switch is connected through line 120 to the output of the comparator 106. If the output of the comparator 106 is indicative if binary numeral 0 there would be a $+3$ volt output of the comparator. In such case, the biasing effect of the resistor arm weighted as 32 in the biasing means 113 would be shunted away from the analog signal bus 98 through the diode switch 119. On the other hand, if the output of the comparator 106 were indicative of a binary 1, the output of the comparator would be a $-3$ volts and there would be no shunting action.

As can be seen, each of the analog signal bias means 114 to 117 has an arm weighted as 32 with a diode switch comparable to diode switch 119 connecting the arm to the line 120. Therefore, assuming that 1 volt equals 1° and the signal on each of the busses 97 to 102 were 32 volts after the biasing effect from line 93, the output of the converter 16 would be 100000. This is because the output of the comparator 106 caused the arm weighted as 32 in each of the bias means 113 to 117 to bias the analog signal on the busses 97 to 102 negatively 32 volts. And, as can be seen, the resistor arm weighted as 1 in the bias means 117 biases the bus 102 to a negative 1 volt potential causing a positive output of the comparator 111 indicative of binary 0. The left-hand arm of the bias means 113 to 116 would similarly cause the comparators 107 to 110 to indicate binary 0.

For other values of analog signal input, the outputs of the comparators 107 to 110 function to selectively bias the respective lesser significant analog signal busses.

As mentioned previously, it is desired to hold the output of the analog-to-digital converter except upon receipt of a strobe signal input. Referring now to the top of FIG. 5 there is shown a circuit including an input transistor 122, a transistor 123 and an output transistor 124. The transistor 123 has a capacitor 125 connected between its collector and base while a resistor 126 is connected between the base of the transistor 123 and $+15$ volts power source. As indicated previously, there is normally a $-6$ volt signal on line 43, which signal holds the output of the analog-to-digital converter 16, and then upon increasing the signal on the line 43 to 0 volts, the converter output may change to correspond to the analog input. The operation of the circuitry for stopping the converter 16 is only important during the stopping action, therefore it will only be described in that sequence. With the signal on line 43 at 0, the transistor 122 is off causing the transistor 123 to be turned on hard. The transistor 124 acts as an emitter follower which causes a 0° potential signal to be put out through line 128 to the comparators 106 to 111. With 0 voltage on the line 128, the comparators 106 to 111 are free to be controlled by their respective analog input busses 97 to 102.

When input line 43 is returned to $-6$ volts, the transistor 122 is turned on, causing its collector to drop to 0 volts. This allows the transistor 123 to act as a Miller integrator due to the feedback capacitor 125. The curernt flowing through the resistor 126, therefore, causes the collector of the transistor 123 to rise at a fixed rate until it reaches the supply voltage. The line 128 follows the collector of transistor 123.

It will be noted that diodes 129 to 133 are located in the line 128 between the respective adjacent comparators. These diodes 129 to 133 each have a certain amount of forward voltage drop and function to cause a sequential stopping of the comparators 106 to 111 from the most significant comparator to the least significant comparator respectively. More particularly, as the signal on the line 128 increases it will first clamp the comparator 106. Then, because of the voltage drop across the diode 129, the comparator 107 will not be clamped until the signal on the line 128 increases further. This processes repeats itself with regard to each of the diodes 130 to 133.

In FIG. 8e there is shown the sector resolution analog input to the analog-to-digital converter 16 after the $(15+k)°$ plus bias. It will be noted that after the shaft angle increases, the signal does not increase as a straight line. This is because of the fact that the reference voltage increases in the negative direction as it approaches the center of the sector and then decreases. It will also be noted that the sloped portions of the saw-toothed curve depicting the sector resolution analog input signal extend beyond the vertical line portions joining the respective sloped line portions. This is to depict the fact that the system has the capacity to have the analog-to-digital converter resolve shaft angles on either side of each particular sector. In the FIG. 8e, the reference voltages similarly overlap to illustrate this feature. It will be noted on the analog input curve of FIG. 8e, the intersection of the lower end of the vertical line portions with the sloped line portions are slightly above 0 volts. This is to illustrate the fact that, when the sector selector and logic circuit switches to a new sector at the designed point there would automatically be an output on the analog-to-digital converter 16. As mentioned above, the inverter amplifiers 68 and 89 function in combination with the transistor switches 62 and 86 to cause the analog signal to the converter 16 to always have a positive slope. If such inverter amplifier were not used, a complementary number unit would be connected between the output of the converter 16 and the input of the adder and readout block 12. Such complementary number unit would be somewhat more accurate than the use of the inverter amplifiers, but such system is much more complicated to show. And since it is conventional, the more easily disclosed circuit including the inverter amplifiers is shown in the drawings.

Figure 6:
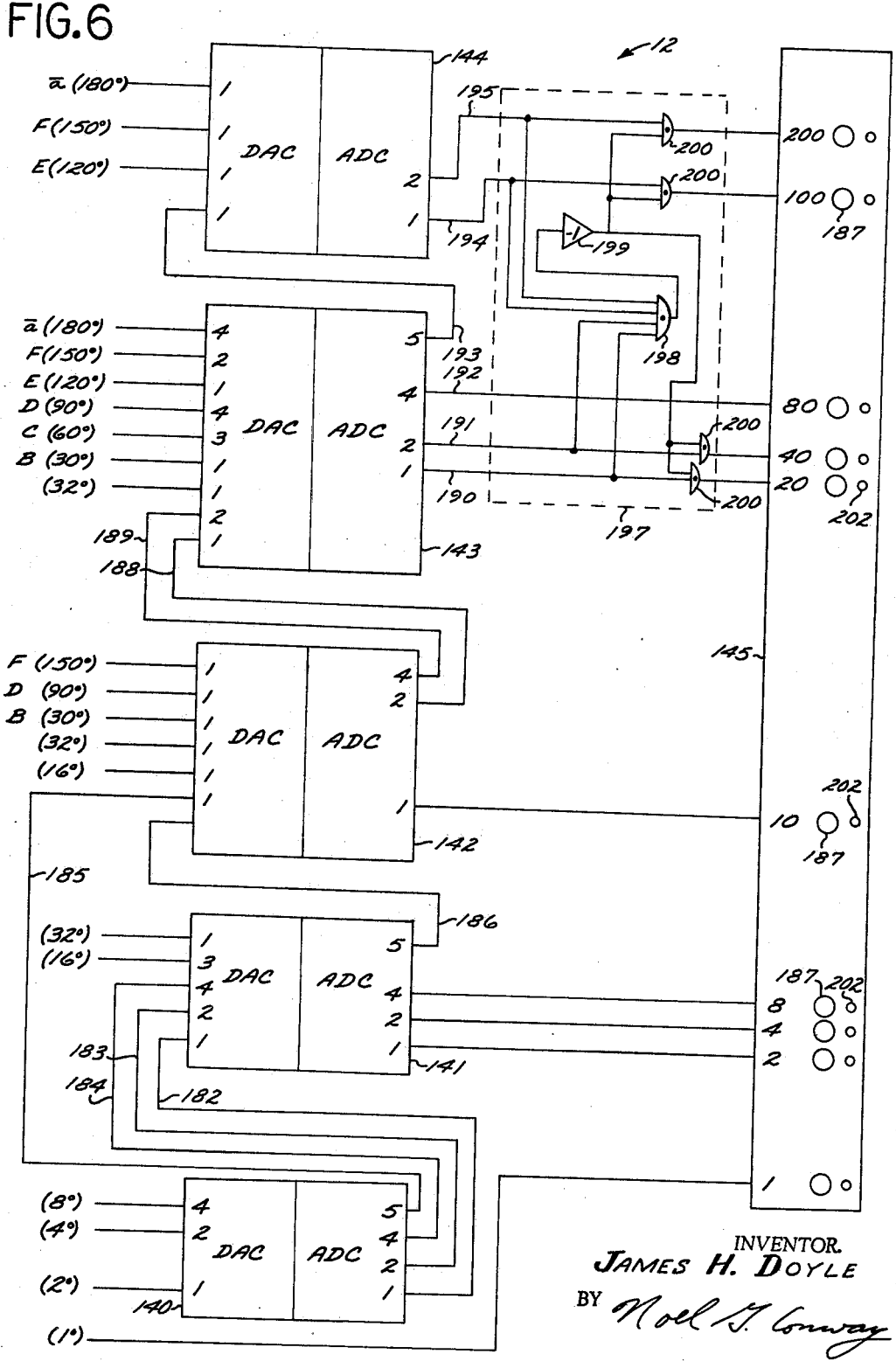
FIG. 6 is a more detailed block diagram of the adder and readout apparatus depicted in FIG. 1.

Referring now to FIG. 6 the adder and readout 12 will be described in further detail. The adder portion of the adder and readout comprises first, second, third, fourth and fifth adder units 140 to 144 respectively. Each of these adder units include a digital-to-analog converter which sums certain digital inputs and an analog-to-digital converter which as an output indicative of the summation of the inputs. Some of the outputs of the adder units 140 to 144 are fed to readout panel 145 and others are carried to more significant adder units—the significance of the adder units being determined by the significance of the inputs to the particular adder units.

Before going on to the logic of the manner in which the various adder units 140 to 144 connected together and to the readout panel, the circuitry of one of the adder units will be described.

Referring now to FIG. 7 there is shown one of the adder units which comprises generally a digital-to-analog converter 147 encircled by a dashed line, the output of which is fed to an amplifier 148, the output of which is fed to an analog-to-digital converter 150. It should be noted that the analog-to-digital converter 150 has only a four bit output which is a simple analog-to-digital converter. If only one major adder unit were used rather than five adder units of the type shown, the analog-to-digital converter would have to be extremely large, further the digital-to-analog converter portion of the adder would inherently have many errors in it. Accordingly, the present improved combination of adder units lends itself to not only low cost construction but improved accuracy of operation.

Referring now to the digital-to-analog converter 147 it is of the type illustrated in my co-pending U.S. patent application Ser. No. 333,972, filed Dec. 27, 1963, now U.S. Patent No. 3,311,910, entitled Electronic Quantitizer. The digital-to-analog converter 147 includes a reference voltage bus 151 and analog summation bus 152. Connected between the reference voltage bus 151 and the analog summation bus 152 are a plurality of resistor arms with one for each adder input lines 155 to 157 plus one additional arm for a purpose to be described. In the illustrated digital-to-analog converter, one of its features is the fact that the impedance of the resistor arms may be weighted as desired. For example, assuming that the unit shown in FIG. 7 is the adder unit 140 having inputs equal to 2°, 4° and 8° from the analog-to-digital converter 16, the inputs can be effectively divided by 2 to 1, 2, and 4 as indicated in FIG. 6. Therefore, by weighting the resistor arms to which the inputs 155 to 157 respectively are connected as 1, 2, and 4 respectively the division can be accomplished. This division is desired because of the output capacity of the respective adder units.

In operation, assuming that the analog-to-digital converter 16 has an output of 14° there would be a negative 3 volt signal on each of the lines 155 to 157 biasing the bus 150 to up 14 units, e.g., 14 volts. If the input were only indicative of 10°, there would be a positive 3 volt signal on line 156 whereupon the biasing effect of the resistor arm weighted as 2 would be shunted away from the bus 152. The analog signal of the summation bus 152 is fed through the amplifier 148 to the analog-to-digital converter 150 where it is fed in parallel through input resistors to analog signal busses 161 to 164. The analog signal on the busses 161 to 164 are fed to comparators 166 to 169 respectively through weighted analog signal bias means 170 to 173. The weighted analog signal bias means 170 to 173 function in the same manner as in the case of the analog-to-digital converter 16. However, it should be noted that the right hand arm of each of the bias means 170 to 173 is weighted as 5 rather than 8 as would be the case in the normal binary system.

For exemplary purposes, the schematic of the comparator 166 is shown. As can be seen, the comparator 166 includes a differential amplifier comprising first input transistor 175 and second input transistor 176 with an output transistor 177. The output signal is fed back to the base of the second input transistor 176 through a feedback resistor 178, which feedback signal is attenuated through resistor 179 to ground. When the output transistor 177 is off, the −15 volt power source biases the output of the comparator negative through the resistor 180. And when the transistor 177 is on, the +6 volt source biases the output positive. As in the case of the comparators of the analog-to-digital converter 16, if, after the effect of the bias means 170 the signal on the bus 161 is positive, the output of the comparator is negative and vice versa. The comparators 106 to 111 of the converter 16 may be substantially the same as the comparator 166 with the following exception. As shown in my above mentioned co-pending U.S. patent application Ser. No. 334,336, now U.S. Patent No. 3,281,608 if it is desired to include means to selectively hold the comparator output in a curent state, means such as a pair of opposed diodes are conected between the input to the transistor 175 and ground thus limiting the input signal to a range of, for example, plus and minus 1 volt. Also, a transistor switch is connected between the resistor 179 and ground. When this switch is closed, the attenuation of the feedback signal to the transistor 177 is sufficient that the comparator can shift with the analog input signal within the limits permitted by the added limiter diodes. However, when, in response to a signal from a remote source, the transistor switch is opened, the attenuation through the resistor 179 is removed, and the hysteresis of the circuit is increased so much that the subsequent inputs to the comparator within the limited range cannot cause changes of output current state.

Referring now back to the function of the resistor arm weighted as ½ in the digital-to-analog converter 147. The digital-to-analog converter 147 inherently has certain errors arising from the components as does the amplifier 148 and the analog-to-digital converter 150. As explained in my above mentioned U.S. patent application entitled Electronic Quantitizer, such arm provides a ½ least significant bit offset between the digital-to-analog converter 147 and the analog-to-digital converter 150 to eliminate errors resulting from such components.

Before leaving the description of the digital-to-analog converter 147, it should be noted that there are two additional resistor arms with input lines shown in dashed lines. These are to illustrate the fact that the digital-to-analog converter may have several more inputs such as are needed in the case of adder units 141 to 144.

Referring back to FIG. 6, the outputs 1, 2, and 4 of the adder unit 140 are fed through lines 182 to 184 respectively to the adder unit 141. To this adder unit 141 there is also fed the signal from the comparators 106 and 107, corresponding to the signals of 32° and 16° respectively. In the adder unit 141 only the 2° of the 32° is being added, and only the 6° of the 16° is being added by the presence of the binary number 1 on the appropriate line. Further, as in the case of the added unit 140, in the adder unit 141 the inputs are essentially divided by 2. Accordingly, the 32° input receives a weight of 1 and the 16° input receives the weight of 3. The outputs of the adder unit 141 weighted as 1, 2, and 4 are fed to the readout panel 145 which has lights 187 which indicate a presence of a signal for readout purposes. However, since in the adder units 140 and 141, the number of degrees as divided by 2, the output is effectively multiplied by 2 by merely placing a number beside the light which is lit twice as great as the weight of the signal in the analog-to-digital converter in the adder unit 141. For example, a signal on the adder unit 141 output weighted as 4 lights a light having the number 8 beside it.

Adder unit 142 is the adder unit which indicates on the readout panel 145 the presence or absence of 10°. Accordingly, the output weighted as 5 in the adder unit 140 is fed through line 185 to the input side of the adder unit 142. Similarly, the output weighted as 5 of the adder unit 141 is fed to the adder unit 142 through the line 186. In the adder unit 142 only 10° of the digital signal on line F (indicative of 150°) is being added, and therefore, a binary 1 input on this line is weighted as 1 in the adder unit 142. The same is true of the inputs on lines D and B, which are indicative of 90° and 30° respectively. The same is true of the inputs which corresponds to 16° and 32°. Accordingly, all of these inputs are weighted as 1. It should be noted that, since the lines F, D, and B are indicative of the particular sector in which the shaft angle is located, only one of them will be supplying an input. Therefore, the maximum input to the digital-to-analog converter of the adder unit 142 is 5 which is equivalent to 50°. The outputs of the adder unit 142 are weighted as 1, 2, and 4 permitting the output to count to 50° in units of 10°. And, if the output is odd, the light 187 by the numeral 10 will be lit.

From the adder unit 142, the outputs weighted as 2 and 4 are fed to the input side of the adder unit 143 through lines 188 and 189. In adder unit 143, the least significant output bit is 20°. Accordingly, the signals on the lines 188 and 189 are weighted in the digital-to-analog converter of the adder unit 143 in units of 20°.

In the adder unit 143, the signal from the line indicating 32° is given a weight of 1 as is a binary 1 signal on the line B which indicates 30°. This is because there is one unit of 20° in 32° and one unit of 20° in 30°. Since there are three units of 20° in 60°, a binary number 1 signal on the line C is weighted as 3. Similarly, the four units of 20° in 90° dictate that a binary number 1 signal on line D is weighted as 4 in the adder unit 143. The adder unit 144 handles units of 100°. Accordingly, an input on line E is weighted as 1, an input on line F is weighted as 2 and an input on line $\bar{a}$ is weighted as 4 in the adder unit 143.

It should be noted again that only one of the lines B to F will be supplying an input. Therefore, the maximum input to the digital-to-analog converter of the adder unit 143 is 12, with which input can be handled by the analog-to-digital converter portion of the adder unit 143. The outputs of the analog-to-digital converter of the adder unit 143 weighed as 1, 2, and 4 are fed through lines 190 to 192 respectively to the readout panel 145. It will be noted that the numerical designation beside the particular lights 187 to be lit are 20 times larger than the weight of the signal.

Since there are five units of 20° in 100, the output of the unit 143 weighed as 5 is fed through line 193 to the adder unit 144. As previously mentioned, the adder unit 144 is weighed in units of 100°. Therefore, a binary 1 signal on the lines E, F, and $\bar{a}$ are weighted as 1. Since only 1 of lines E and F have a binary 1 signal at any one time, only the outputs of the analog-to-digital converter portion of the adder unit 144 are connected up to feed their outputs to the readout panel through lines 194 and 195.

As has been previously mentioned, the analog-to-digital converter 16 has been provided with an output capacity in excess of the number of degrees in a particular sector in order to compensate for errors in the operation of the sector selector and logic circuit 11. It has already been mentioned how the analog-to-digital converter effectively starts counting several degrees before the designed beginning of a sector in order to compensate for a shift into a particular sector before the appropriate shaft angle has been increased. On the other hand, the analog-to-digital converter 16 also has the capacity to keep counting beyond $(30+k)°$ to compensate for a failure of the sector selector and logic circuit 11 to shift to the next larger sector at the appropriate time. This over-ranging capacity gives the unit the theoretical capacity to count beyond 360°—for example, 366°. Since it is desired that in such case, the output of the system be 6°, additional circuitry contained within dashed line 197 is provided. The circuitry includes an "and" gate 198 having four inputs respectively connected to the lines 190, 191, 194 and 195. The output of the "and" gate 198 is fed through an inverter amplifier to one of the inputs of each of the "and" gates 200, one of each of which is located in the lines 190, 191, 194 and 195 respectively. The output of the inverter amplifier 199 is normally on. Therefore, if there is a signal on any three of the four lines 190, 191, 194 and 195, the signal will pass through the respective "and" gates 200 to the readout panel 145. However, if there is a signal on all four lines 190, 191, 194 and 195, that signal will be inverted by the inverter amplifier 199 causing the "and" gates 200 to block the signals—thus subtracting 360° from the output.

As mentioned above, one of the features of the present invention is that suitability for use in rapidly scanning the outputs of a large number of synchros. In such case, the digital signals would be recorded on, for example, magnetic tape. To this end, there is a jack 202 beside each light 187 corresponding to each digital output signal. Leads to tape recorder apparatus can pick up the multibit digital output from the jacks 202.

Figure 9:
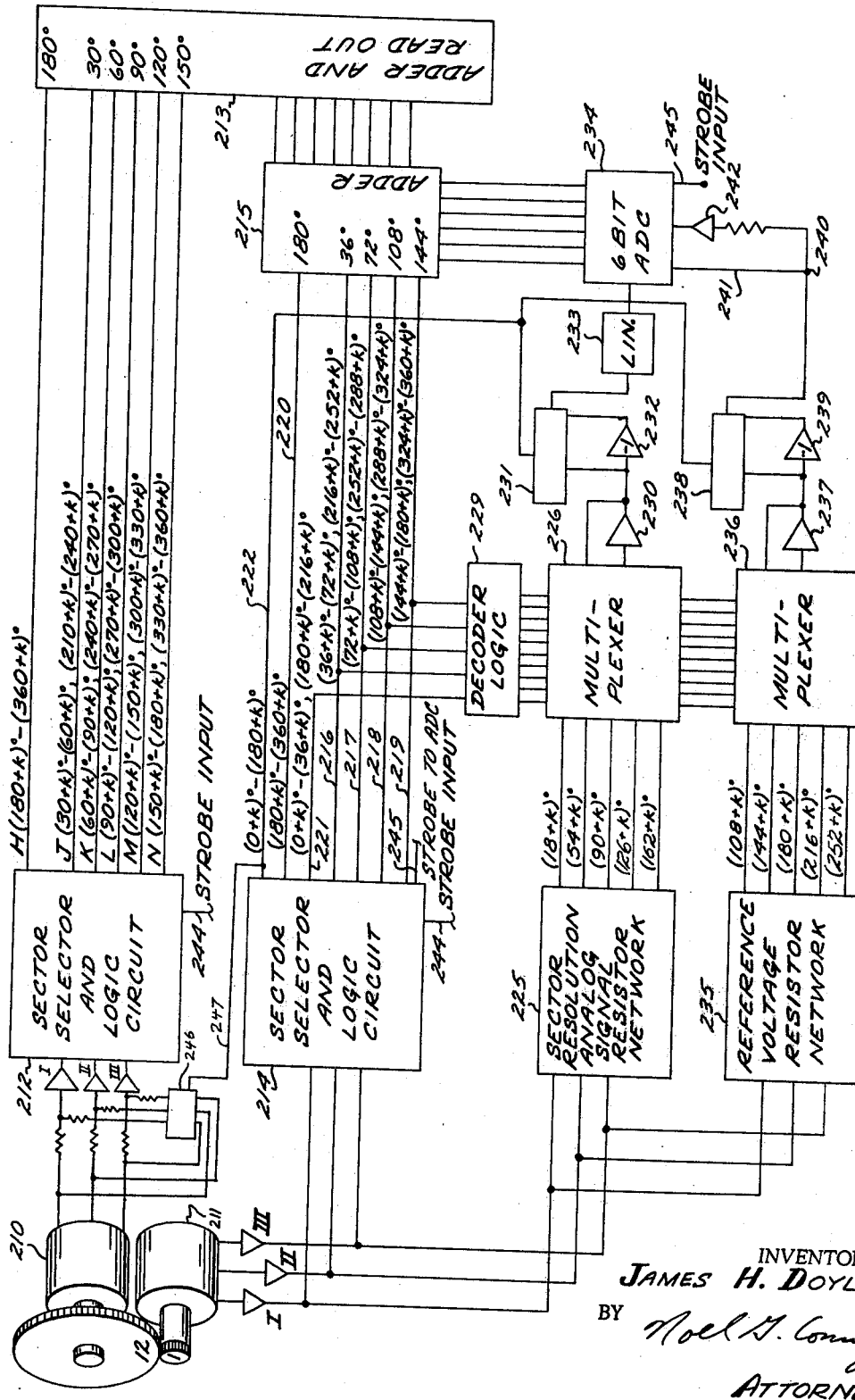
FIG. 9 is a schematic block diagram of a second preferred embodiment of the present invention.

Referring now to FIG. 9, there is shown a second embodiment of the present invention. This system has the capacity of dividing 360° of shaft angle into 1200 parts, whereby the least significant output bit would be indicative of 0.3°. This system includes a coarse synchro 210 having its output lines I, II and III fed into sector selector and logic circuit 212 which is the same as the sector selector and logic circuit 11. The sector selector and logic circuit 212 produces digital output signals on lines H and J to N when the shaft angle is in the ranges indicated on the lines, which outputs are fed to an adder and readout unit 213 comparable to the adder and readout unit 12.

Adjacent to the coarse synchro 210 is a fine synchro 211. The rotation of the shaft of the synchro 211 is connected to the rotation of the shaft of the coarse synchro 210 by means of a pair of gears having a ratio of 12 to 1. Therefore, the shaft of the synchro 211 is rotated 360° each time the shaft of the synchro 210 is rotated through one sector, to wit, 30°. The output lines I to III of the fine synchro 211 are fed to a sector selector and logic circuit 214 which is comparable to the sector selector and logic circuit 11 except that the sector selector resistor network therein divides the 360° circle into 5 output lines per 180° rather than 6 output lines. Therefore, each sector is 36° rather than 30°. The output of the sector selector and logic circuit 214 is fed to an adder 215 which is comparable to the adder portion of the adder and readout 12 through lines 216 to 220. The sector selector and logic circuit 214 also puts out a true signal on line 221 in the sectors indicated on the line, and a plus signal on line 222 through the 180° indicated.

In order to resolve the sectors, a sector resolution analog signal resistor network 225 is provided. This network 225 is comparable to the resistor network 13 except that it has only 5 output lines which corresponds to the 5 sectors in 180° developed by the sector selector and logic circuit 214. As indicated, these output lines are offset to the center of the particular sector to which they correspond. These output lines are fed to a multiplexer 226 corresponding to the multiplexer 14, which multiplexer 226 is controlled by inputs to decoder logic block 229 which is comparable to the decoder logic block 15. The selected outputs from the multiplexer 226 are fed to an operational amplifier 230. Since the operational amplifier 230 inverts the slope of the signal, a transistorized single pole double throw switch 231 is connected to the line 222 to cause the signal to be fed through, and re-inverted by, inverter amplifier 232, and thence to a linearizer 233. From the linearizer 233 the signal is fed to an analog-to-digital converter 234 which is comparable to the analog-to-digital converter 16. During the second 180° of shaft angle, the transistor switch 231 feeds the signal directly to the linearizer as in the first embodiment of the invention.

As in the first embodiment, a reference voltage resistor network 235 is provided to generate reference voltages for the analog-to-digital converter 234. The resistor network 235 is comparable to the resistor network 20 except that it divides the inputs from the synchro 211 into only 5 output lines, the signals on which are 90° out of phase of the output lines of the resistor network 225. From the resistor network 235 the output lines lead to a multiplexer 236 which is controlled in parallel with the multiplexer 226 as in the first embodiment.

The selected reference voltage signal is fed to an operational amplifier 237, which not only amplifies but inverts the slope of the signal. From the amplifier 237, the signal is fed to a transistorized single pole double throw switch 238, directly or through inverter amplifier 239, in response to the control signal from the line 222. From junction 240 at the output side of the switch 238 the reference voltage is fed to the analog-to-digital converter 234 directly, and also is fed to the converter through an amplifier 242 to bias the analog signal input as in the case of the analog-to-digital converter 16.

As in the first embodiment, the system is normally held in a steady output state. Then, when it is desired to update the system to a new shaft angle, a strobe input signal is applied at line 244 to the sector selector and logic circuits 212 and 214 allowing them to change state. From the sector selector and logic circuit 214 the strobe signal is passed through line 245 to the analog-to-digital converter 234 as in the first embodiment.

The sector selector and logic circuit 212 is designed to switch output signals according to the designations on the lines H and J to N. However, because of the limitations of the synchro 210, there are errors in the points at which the unit 212 switches its output. To eliminate these errors the following means is preferably provided.

As indicated on the output lines H and J to N, the sector selector and logic circuit 212 is designed to switch each sector at an angle $k°$ greater than the nominal beginning of the sector. This is satisfactory as the shaft angle of the synchro 210 is increasing toward the nominal end of the sector. The $k°$ offset insures that the sector selector and logic circuit 212 will not switch to the new sector before the angle of the shaft of the synchro 211 passes through $(360+k)°$.

However, additional circuitry is needed in order to cause the sector selector and logic circuit 212 to switch to the highest sector immediately as the shaft angle of the fine synchro 211 passes through $(360+k)°$. To this end, there is provided a switch depicted by block 246, which switch is a three pole single throw switch controlled by a signal through line 247 connected to line 222. As indicated, there is a resistor arm connected between switch 246 and each of the summing junctions of each of the lines I to III. With the switch 246 closed the resistor arm connected to the summing junction of the line I is connected to the input side of the input resistor of the amplifier having the designation III next to it. The resistor arm connected through the line II is also connected through the switch 246 to the input side of the input resistor for the illustrated amplifier of line I, while the resistor arm from the summing junction of the amplifier of line III is connected through the switch 246 to the input side of the input resistor of the illustrated amplifier on line II.

The signal on the line 247 functions to close the switch 246 in response to a signal on line 222 when the shaft angle of the synchro 211 is between $(0+k)°$ and $(180+k)°$ Upon the closing of the switch 246, a signal which passes through the respective resistor arms a signal which shifts the phase of the signals on the lines I to III in relation to the phase of the output signals from the synchro 210 in the negative direction, for example, $2k°$. In such case, there would be a signal on the line J, for example, when the shaft angle of the synchro 210 is between $(30-k)°$ and $(60-k)°$ and also $(210-k)°$ and $(240-k)°$ This causes the sector selector and logic circuit 212 to effectively "snap" from one condition to the other at the proper time dependent upon the shaft angle of the fine synchro 211.

The resistors in the arms connected to the switch 246 need not be precision resistors. However, they must be of such value as to cause a sufficient offset of the phase of the signals on the lines I to III to exceed the accumulated errors of the coarse system. For example, for the coarse system, the value of $k$ could be 5°. However, the value of $k$ in the coarse system need not be the same as the value of $k$ for the fine system. And in most cases, would not be.

Referring now to FIG. 10 a third embodiment of the present invention will be described, which embodiment is useful with a DC or an AC synchro as the prior embodiments were useful with either a DC synchro or an AC synchro. In this embodiment a DC synchro 250 has its output lines I to III fed into sector selector and logic circuit 251. The sector selector and logic circuit 251 is comparable to the sector selector and logic circuit 11, however, the sector selector resistor network divides the 360° into 12 sectors of 30° each. The outputs of the sector selector and logic circuit 251 are fed through lines P to Z to an adder and readout unit 252 which corresponds to the adder and readout unit 12.

In order to resolve the particular sectors, a sector resolution analog signal resistor network 254 is provided, and has 12 output lines corresponding to the 12 sectors developed by the sector selector and logic circuit 251. It will be noted that the phase of the signals on the output lines are set at the center of the sectors with which the signals on the particular lines are used. These output lines from the resistor network 254 are fed to a multiplexer 255 comparable to the multiplexer 14. As in the first embodiment a decoder logic block 257 which is responsive to the signals on lines O to Z controls the multiplexer to select the particular desired analog signal to resolve the sector. From the multiplexer 250 the selected signal is fed through an operational amplifier 256 where it is inverted and thence through an inverter amplifier 258 where it is reinverted to the original positive slope. It should be noted that, if the resistor network 254 were set so that the phase of the signal on each of the output lines were 180° from the indicated phase, the inverter amplifier 258 would not be needed. From the amplifier 258 the signal is fed through a linearizer 259 and thence to an analog-to-digital converter 260, the output of which is fed into adder and readout 252.

In this embodiment, the reference voltage for the analog-to-digital converter can be obtained from a DC voltage source. In such case the reference voltage would be applied at a terminal 261 and fed through line 262 to the analog-to-digital converter. In order to cause the analog signal to be of only one polarity throughout its swing through a sector, the reference voltage is also fed into the amplifier 256 and resistors therein.

The structure shown in FIG. 10 has the advantage that the components involved in the reference voltage resistor network and the multiplexer are not necessary. However, it should be noted that the outputs of DC synchros tend to vary with time, and since in the last mentioned embodiment of the present invention, the analog signal for the analog-to-digital converter comes from one source and the reference voltage comes from another source, the system is more inaccurate than the prior two systems.

While only a few embodiments of the present invention have been shown and described in detail, it will be apparent to those skilled in the art that numerous modifications may be made thereto without departing from the spirit of the present invention. For example, the illustrated embodiments, the system is able to convert the shaft angle of a synchro to a multibit digital output. However, the system is capable of converting to a multibit digital output the information from any transducer which generates a multiline output, and the relation between the multiline signals is indicative of the information put into the transducer. A synchro which resolves shaft angle into a multiline output is the most common example. However, apparatus incorporating the present invention is not limited to merely measuring shaft angle of a synchro.

For example, the system could measure linear position information if the output of the linear displacement transducer were a multisignal output wherein the relation between the various signals was indicative of the linear position. For example, if three coils were placed in a line, and a core were moved linearly through them, and the core had different sections in it which would affect the coils differently according to the position of the core, the required multisignal output would be generated.

Another less common example of a transducer which presents a multiline output signal, the relation of which is indicative of the input information to the transducer is a device known as a Magnasyn—which device does not have a rotary shaft at all. However, the device generates a multiline output signal suitable for driving a synchro repeater or apparatus of the present invention, because the transducer produces a multiline output signal wherein the relationship between the multiple signals is indicative of the input information.

I claim:

1. Means for converting a shaft angle portion to a multibit digital output comprising:
   synchro means having a rotary shaft for presenting an output indicative of the shaft angle of the synchro;
   sector selector means connected to said synchro output for generating a multibit digital signal indicative of the sector in which the shaft angle is located;
   sector resolution analog signal means responsive to said synchro output and said sector digital signal for generating an analog signal indicative of the position of shaft angle within a particular sector, said sector resolution signal means includes means for electrically positioning the phase of said analog signal near the center of a respective sector so that a negative signal is generated if the shaft angle is in one part of the sector and a positive signal is generated if the shaft angle is in the other part of the sector;
   an analog-to-digital converter having an input connected to said analog signal for converting said analog signal into a multibit digital output;
   adder-readout means for adding said sector digital signal and said analog-to-digital converter multibit output and presenting the sum thereof as a multibit digital output;
   and compensating offset means for biasing said analog signal at said analog-to-digital converter an amount equal to at least one half sector so that said analog-to-digital converter digitizes an analog signal of only one polarity regardless of where the shaft angle is in the sector.

2. The means set forth in claim 1 wherein said sector resolution analog signal means includes a resistor network connected to said synchro output, said resistor network dividing said synchro output into $m$ analog signals with one signal for each sector, and said resistor network electrically positioning the phase of each respective signal near the center of a respective sector so that a negative signal is generated if the shaft angle is in one part of the sector and a positive signal is generated if the shaft angle is in the other part of the sector;
   and including compensating offset means for biasing said resolution signal at said input to said analog-to-digital converter sufficiently so that the signal is always of one polarity.

3. Means for converting a shaft angle position to a multibit digital output comprising:
   synchro means having a rotary shaft for presenting output indicative of the shaft angle of the synchro;
   sector selector means connected to said synchro output for generating a multibit digital signal indicative of the sector in which the shaft angle is located;
   sector resolution analog signal means responsive to said synchro output and said sector selector means digital signal for generating an analog signal indicative of the position of shaft angle within a particular sector;
   an analog-to-digital converter having an input connected to said analog signal for converting said analog signal into a multibit digital output;
   adder-readout means for adding said sector digital signal and said analog-to-digital converter multibit output and presenting the sum thereof as a multibit digital output;
   a second synchro means having a second rotary shaft for presenting an output indicative of the shaft angle of the last mentioned synchro means;
   second sector selector means connected to the output of said second synchro means for generating a multibit digital signal indicative of the sector in which the shaft angle is located;
   means connecting the rotation of said first synchro means with the rotation of the second synchro means and causing the shaft of the first synchro means to turn through a significantly greater shaft angle than the second synchro means as the second synchro means shaft is turned;
   and said adder-readout means adds the output of said second sector selector means with the digital output of the summation of the first sector selector means and said analog-to-digital converter and presents the sum thereof as a multibit digital output.

4. Means for converting a shaft angle position to a multibit digital output comprising:
   synchro means having a rotary shaft for presenting an output indicative of the shaft angle of the synchro;
   sector selector means connected to said synchro output for generating a multibit digital signal indicative of the sector in which the shaft angle is located;
   sector resolution analog signal means responsive to said synchro output and said sector digital signal for generating an analog signal indicative of the position of shaft angle within a particular sector, said sector resolution analog signal means having the capacity to generate an analog output indicative of the position of the shaft angle within an adjacent portion of the next sector as well as the particular sector;

an analog-to-digital converter having an input connected to said analog signal for converting said analog signal into a multibit digital output, said analog-to-digital converter having an output capacity indicative of P° of shaft rotation and P is greater than the number of degrees of shaft rotation in the respective sectors;

and adder-readout means for adding said sector selector means digital signal and a said analog-to-digital converter multibit output and presenting the sum thereof as a multibit digital output.

5. The invention set forth in claim 4 wherein said analog-to-digital converter has an output indicative of 0° when the synchro shaft angle is $k°$ less than the shaft angle corresponding to the beginning of a particular sector; and one of said digital bits from said sector selector means indicates to said adder-readout means when the shaft angle is in the last mentioned sector, and said last mentioned one bit is weighted in said adder-readout means as indicative of $k°$ less than the beginning of said last mentioned sector.

6. The invention set forth in claim 4 wherein said analog-to-digital converter has an output indicative of 0° when the shaft angle is $k°$ less than the beginning of each respective sector, and said sector selector multibit digital output is weighted in said adder-readout means as indicative of the shaft angle of the beginning of each sector minus $k°$ respectively.

7. The invention set forth in claim 4 including:
circuit means in said adder-readout means for subtracting 360° from the output of said adder-readout means when the input to said adder-readout means is indicative of greater than 359°.

8. The means set forth in claim 1 wherein said adder-readout means comprises:
a plurality of adder units each capable of receiving a plurality of digital inputs, adding them, and presenting a multibit digital output which is the sum of the digital inputs;
said adder units varying from the least significant adder unit to the most significant adder unit depending upon the significance of the digital inputs thereto, each adder unit other than the most significant adder unit having at least one output connected to the input of the next most significant adder unit to carry that output to said next most significant adder unit, each said one output carried from each adder unit respectively having a significance at least equal to the significance of the least significant digital input to the adder unit to which said one output is carried;
a readout panel for indicating numerically the synchro shaft angle;
and a plurality of said adder units having at least one output connected to said readout panel.

9. The invention set forth in claim 8 wherein the output of each adder unit has no more than four bits.

10. Means for converting a shaft angle position to a multibit digital output comprising:
synchro means having a rotary shaft for presenting an output signal indicative of the shaft angle of the synchro from electrical zero, said signal comprising a plurality of analog signals each having a phase spaced from the other by a predetermined number of degrees of shaft rotation;
sector selector means for converting said synchro output signal into $m$ digital signals indicative of approximately $m$ sectors of $n$ degrees of shaft rotation, said sectors covering successive ranges of shaft angle;
means responsive to said synchro output for generating $m$ sector resolution analog signals, each said resolution analog signal having a phase which is electrically spaced from the others corresponding to $n$ degrees of shaft rotation, each different sector resolution analog signal being indicative of a shaft angle within a respective different sector;

an analog-to-digital converter having an analog input, a reference voltage input, and a multibit digital output;

first multiplexing means responsive to said digital signals for selectively feeding one of said sector resolution analog signals to said analog-to-digital converter input, said selected signal corresponding to the sector which includes the particular shaft angle at which the shaft is located;

reference voltage means responsive to said synchro output for generating $m$ reference voltage signals, each reference voltage signal having a phase ninety electrical degrees from a corresponding sector resolution analog signal;

second multiplexing means responsive to said sector digital signals for selectively feeding one of said reference voltage signals to said analog-to-digital converter reference voltage input, said selected reference voltage signal having a phase ninety electrical degrees from the selected sector resolution signal;

and means for adding said sector digital signals and said analog-to-digital converter multibit digital output and presenting the sum thereof.

11. The means set forth in claim 10 wherein said sector resolution analog signal means includes a resistor network connected to said synchro output, said resistor network dividing said synchro output into $m$ analog signals with one signal for each sector, said resistor network electrically positioning the phase of each respective signal near the center of a respective sector so that a negative signal is generated if the shaft angle is in one part of the sector and a positive signal is generated if the shaft angle is in the other part of the sector;
and including compensating offset means for biasing said resolution signal at said input to said analog-to-digital converter sufficiently so that the signal is always of one polarity.

12. The means set forth in claim 10 wherein said adder-readout means comprises:
a plurality of adder units each capable of receiving a plurality of digital inputs, adding them, and presenting a multibit digital output which is the sum of the digital inputs;
said adder units varying from the least significant adder unit to the most significant adder unit depending upon the significance of the digital inputs thereto, each adder unit other than the most significant adder unit having at least one output connected to the input of the next most significant adder unit to carry that output to said next most significant adder unit;
a readout panel for indicating numerically the synchro shaft angle;
a plurality of said adder units having at least one output connected to said readout panel.

13. The means set forth in claim 10 including:
strobe means connected to said sector selector means for selectively allowing said sector selector means to be responsive to said synchro output upon receipt of a signal to said strobe means;
means connected to said strobe means and said analog-to-digital converter for allowing the analog-to-digital converter to be responsive to the analog input to the analog-to-digital converter upon receipt of said strobe signal.

14. The invention set forth in claim 13 wherein:
said strobe means normally holds said sector selector means non-responsive to said synchro output signal in an output condition determined by the synchro output signal at the time of a previous signal to the strobe means;

and said analog-to-digital converter output can be responsive to the sector resolution analog signal input only upon receipt of said strobe signal.

15. The means set forth in claim 10 wherein:

said analog-to-digital converter has an output capacity indicative of P degrees of shaft rotation and P is greater than the number of degrees of shaft rotation in the respective sectors;

and said sector resolution analog signal means has the capacity to generate an analog output indicative of the position of the shaft angle within an adjacent portion of the next sector as well as the particular sector.

16. The invention set forth in claim 15 wherein said analog-to-digital converter has an output indicative of 0° when the synchro shaft angle is $k°$ less than the shaft angle corresponding to the beginning of a particular sector;

and one of said digital bits from said sector selector means indicates to said adder-readout means when the shaft angle is in the last mentioned sector, and said last mentioned one bit is weighted in said adder-readout means as indicative of $k°$ less than the beginning of said last mentioned sector.

17. The invention set forth in claim 15 wherein said analog-to-digital converter has an output indicative of 0° when the shaft angle is $k°$ less than the beginning of each respective sector, and said sector selector multibit digital output is weighted in said adder-readout means as indicative of the shaft angle of the beginning of each sector minus $k°$ respectively.

18. The invention set forth in claim 15 including:

circuit means in said adder-readout means for substracting 360° from the output of said adder-readout means when the input to said adder-readout means is indicative of greater than 359°.

19. Means for converting a shaft angle position to a multidigital output comprising:

first synchro means having a rotary shaft and a plurality of output lines for presenting a multiline output with the signals on the different lines having different phases with respect to shaft angle and the relativity of the amplitudes of the output signals being indicative of the shaft angle of the synchro;

first sector means connected to said synchro output having a plurality of output lines for generating multibit digital signal indicative of the sector in which the shaft angle is located, said sector selector means including a plurality of resistor bridges each connected between two synchro output lines, a separate output line of said sector selector means connected to each resistor bridge intermediate the ends thereof whereby the phase of the signal on that output line is different from the signals on the synchro means output lines between which the associated resistor bridge is connected;

first sector resolution analog signal means having a plurality of output lines and being responsive to said synchro means output and said sector selector digital signal for generating an analog signal indicative of the position of shaft angle within a particular sector, said sector resolution analog signal output line connected to each resistor bridge intermediate the ends thereof whereby the phase of the signal on that respective analog signal output line is different than the signals on the synchro means output lines between which the associated resistor bridge is connected;

an analog-to-digital converter having an input connected to said analog signal for converting the analog signal into a multibit digital output;

a second synchro means having a second rotary shaft and having $n$ output lines for presenting $n$ output signals, the phase of which are spaced apart a predetermined amount, and the relativity of the amplitude of which is indicative of the shaft angle of the second synchro means;

second sector selector means connected to the output lines of said second synchro means for generating a multibit digital signal indicative of the sector in which the shaft angle of the second rotary shaft is located;

means connecting the rotation of said first synchro means with the rotation of said second synchro means and causing the shaft of first synchro means to turn through a significantly greater shaft angle than the second synchro means as the second synchro means shaft is turned;

and adder-readout means for adding the output of said second sector selector means with the digital output of the summation of the first sector selector means and said analog-to-digital converter and presenting the sum thereof as a multibit digital output.

20. The means set forth in claim 19 wherein the output of said second sector selector means shifts to indicate a new higher sector each time the shaft of said first synchro mean is rotated through a shaft angle of $x°$, and said second selector means includes:

resistor network means connected to the output lines of said second synchro means for selectively shifting the phase of the outputs of the signals of the second synchro means fed to said second sector selector means, said resistor network means including $n$ resistor arms selectively connected between different output lines of said synchro means;

switch means connected in each of said resistor arms, said switch means being connected to the output of said first sector selector means and responsive thereto to cause said switch means to connect said resistor arms between said output lines of said second synchro means during certain parts of the 360° rotation of said first synchro means shaft angle.

21. The means set forth in claim 20 wherein said switch means connects said resistor arms between the respective second synchro output lines when said first synchro means is at a shaft angle on one side of $x°$ and disconnects said resistor arms as the first synchro means shaft angle moves to the other side of $x°$.

22. The means set forth in claim 21 wherein said second sector selector means has output lines which give true signals at different sectors, and the signals on said last mentioned output lines are weighted in said adder-readout means as $k°$ less than the designed beginning of the different sectors, and said resistor network means shift the phase of said second synchro means inputs to said second sector selector means by an amount greater than $k°$ so that the second sector selector means output will indicate a particular sector when the shaft angle of the second synchro means is more than $k°$ less than the designed beginning of the particular sector when said resistor network means is connected.

23. The means set forth in claim 22 wherein said resistor network shifts the phase of the second synchro means input to the second sector selector means by approximately $2k°$.

24. Means for converting a shaft angle position to a multibit digital output comprising:

synchro means having a rotary shaft for presenting an output indicative of the shaft angle of the synchro;

sector selector means connected to said synchro output for generating a multibit digital signal indicative of the sector in which the shaft angle is located;

strobe means connected to said sector selector means for selectively allowing said sector selector means to be responsive to said synchro output upon receipt of a signal to said strobe means, said strobe means normally holding said sector selector means nonresponsive to said synchro output signal in an output condition determined by the synchro output signal at the time of a previous signal to the strobe means;

sector resolution analog signal means responsive to said synchro output and said sector digital signal for generating an analog signal indicative of the position of shaft angle within a particular sector;

and an analog-to-digital converter having an input connected to said analog signal for converting said analog signal into a multibit digital output, said analog-to-digital converter output being responsive to the sector resolution analog signal input only upon receipt of said strobe signal.

25. The combination set forth in claim 24 including: an adder-readout means for adding the multibit digital signal from the sector selector means and the multibit output of said analog-to-digital converter and presenting the sum thereof as a multibit digital output, said adder-readout means comprising:
  a plurality of adder units each capable of receiving a plurality of digital inputs, adding them, and presenting a multibit digital output which is the sum of the digital input;
  said adder units varying from the least significant adder unit to the most significant adder unit depending upon the significance of the digital inputs thereto, each adder unit other than the most significant adder unit having at least one output connected to the input of the next most significant adder unit to carry that output to the next most significant adder unit;
  and one adder unit other than the most significant adder unit having digital inputs of significances the sum of which is at least equal to the significance of the least significant digital input to the adder unit which is next most significant as compared to said one adder unit.

26. In combination with a synchro transducer having $n$ output lines at which appear $n$ analog output signals, the phase of said signals being spaced apart a predetermined amount, the relativity of the amplitudes of the analog output signals being indicative of the input to the transducer through a predetermined range of inputs:
  sector selector means connected to said output lines for dividing said range of inputs into a plurality of sectors and for generating a multibit digital signal indicative of a particular sector according to the input to the transducer;
  sector resolution analog signal means responsive to said transducer output and said last mentioned digital signal for generating a sector resolution analog signal indicative of the input to the transducer within one sector of said sectors, said sector resolution analog signal means having a capacity to generate an analog output indicative of a transducer input in an adjacent portion of an adjacent sector as well as said one sector;
  an analog-to-digital converter having an input connected to said sector resolution analog signal for converting said last mentioned signal into a multibit digital output, said analog-to-digital converter having an output capacity indicative of a range of inputs to the transducer which last mentioned range is greater than the range of said one sector.

27. The combination set forth in claim 26 including: an adder-readout means for adding the multibit digital signal from the sector selector means and the multibit output of said analog-to-digital converter and presenting the sum thereof as a multibit digital output, said adder-readout means comprising:
  a plurality of adder units each capable of receiving a plurality of digital inputs, adding them, and presenting a multibit digital output which is the sum of the digital input;
  said adder units varying from the least significant adder unit to the most significant adder unit depending upon the significance of the digital inputs thereto, each adder unit other than the most significant adder unit having at least one output connected to the input of the next most significant adder unit to carry that output to the next most significant adder unit;
  and one adder unit other than the most significant adder unit having digital inputs of significances the sum of which is at least equal to the significance of the least significant digital input to the adder unit which is next most significant as compared to said one adder unit.

28. In combination with a synchro transducer having $n$ output lines at which appear $n$ analog output signals, the phase of said signals being spaced apart a predetermined amount, the relativity of the amplitudes of the analog output signals being indicative of the input to the transducer through a predetermined range of inputs;
  sector selector means connected to said output lines for generating a multibit digital signal indicative of a sector of the range of inputs to the synchro transducer;
  sector resolution analog signal means responsive to said transducer output and said last mentioned digital signal for dividing said range of inputs into a plurality of sectors and for generating a sector resolution analog signal indicative of a particular sector according to the input to the transducer, said sector resolution analog signal means having connected to it a means for dividing said transducer output into $m$ analog signals with the signal for each sector of input and for electrically positioning the phase of each respective signal near the center of a respective sector so that a negative signal is generated if the input is in one part of a sector and a positive signal is generated if the input is in the other part of the sector;
  an analog-to-digital converter having an input connected to said sector resolution analog signal of a particular sector for converting said last mentioned signal into a multibit digital output, compensating offset means for biasing said sector resolution signal at said analog-to-digital converter an amount equal to at least one half sector so that said analog-to-digital converter digitizes an analog signal of only one polarity regardless of where said input is in a particular sector.

29. The combination set forth in claim 28 including: an adder-readout means for adding the multibit digital signal from the sector selector means and the multibit output of said analog-to-digital converter and presenting the sum thereof as a multibit digital output, said adder-readout means comprising:
  a plurality of adder units each capable of receiving a plurality of digital inputs, adding them, and presenting a multibit digital output which is the sum of the digital input;
  said adder units varying from the least significant adder unit to the most significant adder unit depending upon the significance of the digital inputs thereto, each adder unit other than the most significant adder unit having at least one output connected to the input of the next most significant adder unit to carry that output to the next most significant adder unit;
  and one adder unit other than the most significant adder unit having digital inputs of significances the sum of which is at least equal to the significance of the least significant digital input to the adder unit which is next most significant as compared to said one adder unit.

30. The combination set forth in claim 28 including: strobe means connected to said sector selector means for selectively allowing said sector selector means to be responsive to said transducer output upon receipt of a signal to said strobe means, said strobe means normally holding said sector selector means non-responsive to said transducer output signal in in output condition determined by the synchro output signal at the time of a previous signal to the strobe means;

means connected to said strobe means and said analog-to-digital converter for allowing the analog-to-digital converter to be responsive to the analog input to the analog-to-digital converter upon receipt of said strobe signal, said analog-to-digital converter output being responsive to said sector resolution analog signal input only upon receipt of said strobe signal.

References Cited

UNITED STATES PATENTS

| | | | |
|---|---|---|---|
| 2,862,661 | 12/1958 | Goldman | 318—20.735 |
| 2,922,579 | 1/1960 | Goldman | 318—20.735 |
| 2,984,831 | 5/1961 | Oken et al. | 340—347 |
| 3,023,959 | 3/1962 | Rabin et al. | 340—347 |
| 3,045,230 | 7/1962 | Tripp et al. | 340—347 |
| 3,217,318 | 11/1965 | Masel | 340—347 |
| 3,295,125 | 12/1966 | Idelsohn et al. | 340—347 |
| 3,322,941 | 5/1967 | Brooks et al. | 340—347 |
| 3,351,952 | 11/1967 | Kobold et al. | 318—20.735 |

MAYNARD R. WILBUR, Primary Examiner

JEREMIAH GLASSMAN, Assistant Examiner